(12) United States Patent  
Buesker et al.

(10) Patent No.: US 10,110,488 B2  
(45) Date of Patent: Oct. 23, 2018

(54) DATA LINK INTERFACE INTERNET PROTOCOL (IP) ADDRESS GENERATION

(71) Applicant: QUALCOMM Incorporated, San Diego, CA (US)

(72) Inventors: Brian Michael Buesker, San Diego, CA (US); Abhishek Pramod Patil, San Diego, CA (US); Santosh Paul Abraham, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 15/134,572

(22) Filed: Apr. 21, 2016

(65) Prior Publication Data

US 2016/0315859 A1    Oct. 27, 2016

Related U.S. Application Data

(60) Provisional application No. 62/151,954, filed on Apr. 23, 2015, provisional application No. 62/209,279, filed on Aug. 24, 2015.

(51) Int. Cl.
| | |
|---|---|
| *H04L 12/28* | (2006.01) |
| *H04L 12/749* | (2013.01) |
| *H04L 29/12* | (2006.01) |
| *H04L 29/06* | (2006.01) |

(52) U.S. Cl.
CPC ........ *H04L 45/741* (2013.01); *H04L 61/2007* (2013.01); *H04L 69/22* (2013.01); *H04L 61/2038* (2013.01); *H04L 61/2046* (2013.01); *H04L 61/6004* (2013.01)

(58) Field of Classification Search
CPC ... H04L 45/741; H04L 69/22; H04L 61/2007; H04L 61/6004; H04L 61/2038; H04L 61/2046

See application file for complete search history.

(56) References Cited

U.S. PATENT DOCUMENTS

| | | | |
|---|---|---|---|
| 2005/0083859 A1* | 4/2005 | Kang | H04L 29/12254 370/254 |
| 2006/0080458 A1* | 4/2006 | Lindemann | H04L 29/12367 709/237 |
| 2007/0253431 A1* | 11/2007 | Park | H04L 29/12254 370/395.52 |

(Continued)

OTHER PUBLICATIONS

Hinden R., et al., "Unique Local IPv6 Unicast Addresses," RFC4193 Standards Track, Network Working Group, Oct. 2005, The Internet Engineering Task Force, Fremont, CA, 15 pgs.

(Continued)

*Primary Examiner* — Clemence S Han  
(74) *Attorney, Agent, or Firm* — Toler Law Group, PC.

(57) ABSTRACT

An apparatus includes a memory and a processor coupled to the memory. The processor is configured to determine a first identifier that corresponds to a data link group identifier of a data link group and to determine a second identifier that corresponds to a device. The processor is further configured to generate an internet protocol (IP) address for a data link interface of the device based on a combination of a data link routing prefix, the first identifier, and the second identifier.

30 Claims, 10 Drawing Sheets

(56) References Cited

U.S. PATENT DOCUMENTS

| | | | |
|---|---|---|---|
| 2009/0248841 A1* | 10/2009 | Tjandra | H04L 29/12216 709/220 |
| 2010/0023617 A1* | 1/2010 | Tremaine | H04L 29/12264 709/224 |
| 2012/0054340 A1 | 3/2012 | Kicherer et al. | |
| 2012/0054869 A1* | 3/2012 | Yen | H04L 29/12066 726/24 |
| 2012/0290731 A1* | 11/2012 | Suumaki | H04L 61/2007 709/228 |
| 2013/0046864 A1* | 2/2013 | Behringer | H04L 61/6059 709/220 |
| 2013/0205040 A1* | 8/2013 | Naor | H04L 61/256 709/238 |
| 2013/0326086 A1* | 12/2013 | Hamachi | H04L 61/2007 709/245 |
| 2014/0376405 A1* | 12/2014 | Erickson | H04W 52/0212 370/254 |
| 2016/0249208 A1* | 8/2016 | Abraham | H04L 61/2038 |
| 2017/0222923 A1* | 8/2017 | Hui | H04L 45/70 |
| 2017/0272416 A1* | 9/2017 | Erickson | H04W 52/0212 |

OTHER PUBLICATIONS

Indrasinghe, S., et al., "Conflict Free Address Allocation Mechanism for Mobile Ad Hoc Networks," 21st International Conference on Advanced Information Networking and Applications Workshops, AINAW '07, 2007, IEEE, Piscataway, NJ, pp. 852-857.

International Search Report and Written Opinion for International Application No. PCT/US2016/028907, ISA/EPO, dated Jul. 5, 2016, 13 pgs.

Cheshire S., "IPv4 Address Conflict Detection", Network Working Group Request for Comments 5227, Standards Track, Jul. 2008, pp. 1-21.

Hinden R., et al., "IP Version 6 Addressing Architecture", RFC 2373, IETF Standard, Internet Engineering Task Force, IETF, CH, Jul. 1998, 21 Pages.

Stretch., "PacketLife.net", EUI-64 in IPv6, Aug. 4, 2008, 11 Pages.

Thomson S., et al., "IPv6 Stateless Address Autoconfiguration", Network Working Group Request for Comments 4862, Standards Track, Sep. 2007, XP015052408, pp. 1-30.

* cited by examiner

DATA LINK INTERFACE INTERNET PROTOCOL (IP) ADDRESS GENERATION

I. CROSS REFERENCE TO RELATED APPLICATIONS

The present application claims the benefit of U.S. Provisional Patent Application No. 62/151,954, entitled "NEIGHBOR AWARE NETWORK DATA LINK (NDL) INTERFACE INTERNET PROTOCOL (IP) ADDRESS GENERATION," filed Apr. 23, 2015 and U.S. Provisional Patent Application No. 62/209,279, entitled "NEIGHBOR AWARE NETWORK DATA LINK (NDL) INTERFACE INTERNET PROTOCOL (IP) ADDRESS GENERATION," filed Aug. 24, 2015, which are expressly incorporated by reference herein in their entirety.

II. FIELD

The present disclosure is generally related to data link interface internet protocol (IP) address generation.

III. DESCRIPTION OF RELATED ART

As wireless devices become less expensive and more common, networks can experience increased traffic, potentially burdening the networks, slowing performance of the wireless devices, and frustrating users. Accordingly, network setup and network resource allocation (e.g., how traffic is routed within a network) may be considered in designing and implementing wireless networks.

Proximity-based services may enable direct communication between devices that are within a particular distance of each other (e.g., via a neighbor-aware network (NAN) or a wireless mesh network). A data link group (e.g., a social wireless fidelity (Wi-Fi) network, such as a mesh network) may be built on top of a wireless network, such as a NAN. To illustrate, devices of the data link group (also referred to as a NAN data link (NDL)) may be part of the wireless network. A particular device may be included in multiple data link groups. For example, a first data link interface of the particular device may correspond to a first data link group and a second data link interface of the particular device may correspond to a second data link group. The particular device may include an application. First data from the application may be sent via the first data link interface to one or more devices of the first data link group. Second data from the application may be sent via the second data link interface to one or more devices of the second data link group.

IV. SUMMARY

In a particular aspect, an apparatus includes a memory and a processor coupled to the memory. The processor is configured to determine a first identifier that corresponds to a data link group identifier of a data link group. The processor is configured to determine a second identifier that corresponds to the device. The processor is further configured to generate an internet protocol (IP) address for a data link interface of the device based on a combination of a data link routing prefix, the first identifier, and the second identifier.

In another aspect, a method includes determining, by a device, a first identifier that corresponds to a data link group identifier of a data link group. The method includes determining, by the device, a second identifier that corresponds to the device. The method further includes generating, by the device, an internet protocol (IP) address for a data link interface of the device based on a data link routing prefix, the first identifier, and the second identifier.

In another aspect, an apparatus includes means for determining a first identifier that corresponds to a data link group identifier of a data link group. The apparatus includes means for determining a second identifier that corresponds to a device. The apparatus further includes means for generating an internet protocol (IP) address for a data link interface of the device based on a combination of a data link routing prefix, the first identifier, and the second identifier.

In another aspect, a computer-readable storage device stores instructions that, when executed by a processor, cause the processor to perform operations including determining a first identifier that corresponds to a data link group identifier of a data link group. The operations include determining a second identifier that corresponds to a device. The operations further include generating an internet protocol (IP) address for a data link interface of the device based on a data link routing prefix, the first identifier, and the second identifier.

The present disclosure is not intended to be limited based on the aspects described in the Summary. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Particular aspects of the present disclosure are described below with reference to the drawings. In the description, common features are designated by common reference numbers. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where." As used herein, an ordinal term (e.g., "first," "second,"

"third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "subset" refers to a grouping of one or more elements, and the term "plurality" refers to multiple elements.

Figure 1:
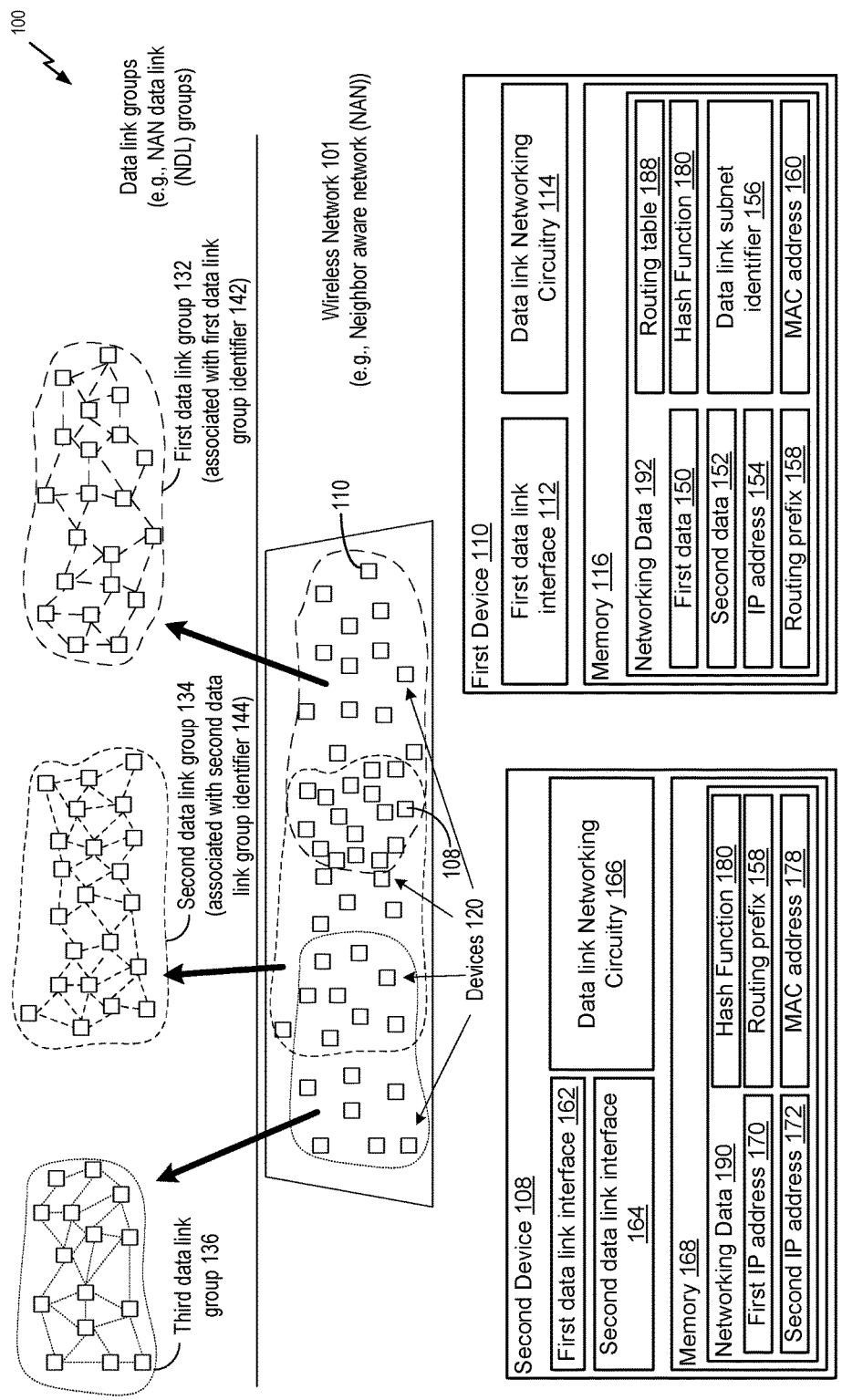
FIG. 1 is a block diagram of an illustrative example of a system that includes one or more data link groups.

Referring to FIG. 1, an illustrative example of a system 100 that includes one or more data link groups is shown. The system 100 includes a wireless network 101, such as a data link group network or a neighbor aware network (NAN). The wireless network 101 may include multiple devices, such as representative devices 120, a second device 108, and a first device 110.

The wireless network 101 may include or correspond to one or more data link groups (e.g., one or more meshes or mesh networks). As used herein, a data link group may include an infrastructure-less peer-to-peer network, such as an ad-hoc network. The data link group may include multiple devices that are able to form a network, such as a decentralized wireless network. Additionally, each device of the data link group may use common security credentials that may be exchanged in band or out of band with one or more communication channels used by the data link group. In some implementations, the devices of the data link group may be synchronized to have periodic wake-up times, such as time periods when each of the devices is awake to advertise and receive traffic and other messages.

The wireless network 101 may include or correspond to a data link group that includes one or more devices, such as the devices 108, 110, 120. The data link group may also be referred to as a data link, a data link network, a group network, a NAN data link (NDL), an NDL network, a data path group, a data path group network, a NAN data path, a NAN data path group, or a NAN data path group network. In some implementations, the data link group may be a mesh group included in a mesh network, such as a "social Wi-Fi mesh network" or an Institute of Electrical and Electronics Engineers (IEEE) 802.11s mesh network, as illustrative, non-limiting examples. As another example, the data link group may include an infrastructure-less peer-to-peer (p2p) network. In a particular aspect, the data link group may be a "multi-hop" data link group, and messages and data may be transmitted from a first device of the data link group to other electronic devices of the data link group, and the other devices may propagate the message and data to more devices. In another particular aspect, the data link group may be a "single-hop" data link group, and the paging message may be transmitted by a provider device to one or more devices of the data link group.

Each of the devices 108, 110, 120 may be a wireless communication device configured to transmit data, to receive data, or both, from one or more other wireless communication devices included in the wireless network 101. The wireless network 101 may be an infrastructure network or an infrastructure-less network, such as a peer-to-peer network (e.g., an ad-hoc network). For example, each of the devices 108, 110, 120 of the wireless network 101 (e.g., the NAN) may be configured to perform association operations (e.g., security association operations), security information exchange operations, synchronization operations, negotiation operations, and other operations via one or more wireless channels corresponding to the NAN. In some implementations, the devices 108, 110, 120 may perform such operations in accordance with one or more standards, such as an Institute of Electrical and Electronics Engineers (IEEE) 802.11 standard (e.g., a IEEE 802.11s standard), a Wi-Fi Alliance standard, a NAN standard, or a combination thereof, as illustrative, non-limiting examples. For example, the devices 108, 110, 120 of the system 100 may be configured to communicate wirelessly according to one or more wireless communication protocols. To illustrate, the devices 108, 110, 120 of the system 100 may send and receive discovery messages, such as beacons in connection with an Institute of Electrical and Electronics Engineers (IEEE) 802.11 protocol. In this context, a protocol may refer to parameters used to communicate, such as an identifier of a channel via which communications occur, timing of communications (e.g., timing of discovery intervals), etc. In another example, the devices 108, 110, 120 of the system 100 may also communicate data, such as data corresponding to a particular application (or service) that is common to one or more devices 108, 110, 120 of the system 100. The system 100 may include more than or fewer than the illustrated number of devices.

The multiple devices of the wireless network 101 (e.g., the NAN) may be synchronized (e.g., using beacons) to enable the multiple devices to wake up (e.g., switch to an active mode) periodically during discovery windows of the wireless network 101. Each of the multiple devices may monitor the same NAN communication channel during the discovery windows. The wireless network 101 may be identified by a NAN identifier. The NAN identifier may be included in each NAN message, such as in each NAN discovery message. A device that initiates formation of wireless network 101 may select the corresponding NAN identifier.

A subset of the multiple devices may transmit synchronization beacons, discovery beacons, or both, via the NAN communication channel that corresponds to the wireless network 101. Discovery messages and the synchronization beacons may be transmitted by one or more of the multiple devices during the discovery windows via the NAN communication channel. A discovery message may be used by a device (not included in the wireless network 101) to discover the wireless network 101 and to enable the device to join the wireless network 101. A synchronization beacon may be used by the multiple devices of the wireless network 101 for time synchronization function (TSF) correction.

In some implementations, the wireless network 101 may have a structure, such as a tree structure. For example, the structure (e.g., the tree structure) may be anchored at a particular device (called an anchor master) of the multiple devices. A timing of the anchor master may be propagated to each of the multiple devices of the wireless network 101 via one or more synchronization (synch) devices and one or more master devices. The one or more synch devices and the one or more master devices may enable time synchronization within the wireless network.

There may be one or more data link groups (e.g., a first data link group 132, a second data link group 134, and a third data link group 136) that correspond to the wireless network 101. In a particular illustrative implementation, a data link group may include or correspond to an NDL group of a NAN. In another particular implementation, a data link group may include or correspond to a wireless mesh network, such as a "social wi-fi mesh" network, or a subset of a wireless mesh network, as an illustrative, non-limiting example. In other illustrative, non-limiting examples, the techniques of the present disclosure may be used in an infrastructure-less peer-to-peer (p2p) network or another form of device-to-device direct network without infrastructure. Devices of the data link group may perform data exchanges via wireless communications (e.g., without involving one or more wireless carriers, one or more wireless fidelity (Wi-Fi) access points, the Internet, or a combination thereof). For example, the devices of the data link group may share a security credential, such as a group key (e.g., a common group key), to enable communication. To illustrate, each device of the data link group may use the group key to encode, decode, or both, group messages. In some implementations, one or more services may be provided by one or more of the devices of the data link group. The one or more services may include a music service, a social media sharing service, a file sharing service, another service, or a combination thereof, as illustrative, non-limiting examples. In some implementations, one or more services may include or correspond to one or more NDL services.

In a particular implementation, the data link groups 132-136 may correspond to distinct applications, distinct vendors, distinct types of devices, distinct operating systems, or a combination thereof. A particular device may be included in one or more data link groups. For example, the first device 110 may be included in the first data link group 132. As another example, the second device 108 may be included in the first data link group 132 and the second data link group 134. Each data link group of the wireless network 101 may have a corresponding group identifier, such as unique value (e.g., a byte value, a group address, or a combination thereof). For example, the first data link group 132 may have a first data link group identifier 142. As another example, the second data link group 134 may have a second data link group identifier 144. In some implementations, a data link group identifier may include or correspond to an NDL group identifier.

A provider device may provide data that corresponds to a service to one or more devices of a data link group. In some implementations, the provider device may receive the data via a telecommunications connection. For example, the provider device may wirelessly communicate with a base station and receive the data that corresponds to the service via the base station. A proxy device may receive data that corresponds to a service from a device and may forward the data to other devices. A consumer device may receive data that corresponds to a service from a device. In a particular implementation, the first data link group 132 may include a first subset of the multiple devices included in the wireless network 101, the second data link group 134 may include a second subset of the multiple devices, and the third data link group 136 may include a third subset of the multiple devices. Each subset of devices may include one or more devices from another of the subset of devices. To illustrate, the second device 108 may be a provider device of a first service in a particular data link group (e.g., the second data link group 134), may be a proxy device of a second service in another data link group (e.g., the first data link group 132), may be a consumer device of one or more of the first service, the second service, or a third service in another data link group, or a combination thereof.

A particular device of the first data link group 132 may advertise availability of a service by sending (e.g., transmitting) a discovery message. The discovery message may include the first data link group identifier 142. In response to receiving the discovery message, one or more devices may join the first data link group 132 to receive data corresponding to the service. In some implementations, the particular device may multicast the discovery message, the data corresponding to the service, or a combination thereof, to multiple devices of the first data link group 132.

The first device 110 may include data link networking circuitry 114, a first data link interface 112, a memory 116, or a combination thereof. The data link networking circuitry 114 may be configured to perform one or more functions described herein with reference to operation of the first device 110. For example, one or more operations described herein as being performed by the first device 110 may be performed by the data link networking circuitry 114. The first data link interface 112 may be a network interface configured to communicate with one or more devices of the first data link group 132. In some implementations, data link networking circuitry may include or correspond to NDL networking circuitry. The memory 116 may include networking data 192. The networking data 192 may include the first data 150, the second data 152, the IP address 154, the data link subnet identifier 156, the routing prefix 158, the MAC address 160, or a combination thereof, as further described herein.

During operation, the first device 110 may determine first data 150 (e.g., a first identifier) that corresponds to the first data link group identifier 142. For example, the first device 110 may generate or receive the first data 150 corresponding to the first data link group identifier 142. To illustrate, the first device 110 may generate a discovery message indicating that the first device 110 is available to provide a first service via the first data link group 132. The first device 110 may include the first data 150 in the discovery message. As another illustration, the first device 110 may receive the discovery message, including the first data 150, from a device of the first data link group 132.

The discovery message may include identifier data that indicates the first data link group identifier 142. The first data link group identifier 142 may be unique to the first data link group 132 within the wireless network 101. For example, the first device 110 may generate the first data link group identifier 142 such that the first data link group identifier 142 does not conflict with data link group identifiers in use in the wireless network 101. To illustrate, the first device 110 may maintain group identifier data indicating the data link group identifiers that have been used recently. In a particular implementation, the first device 110 may add a particular data link group identifier to the group identifier data in response to receiving a message indicating the particular data link group identifier.

The first device 110 may generate the first data link group identifier 142 to be distinct from the data link group identifiers indicated by the group identifier data. In a particular implementation, the first device 110 may generate the first data link group identifier 142 so that a result of applying a hash function 180 to the first data link group identifier 142 is distinct from results of applying the hash function 180 to the data link group identifiers indicated by the group identifier data. The hash function 180 may be user-defined. For example, the first device 110 may determine the hash function 180 based on user input. In a particular implementation, the hash function 180 may correspond to a default function.

The first data 150 may correspond to the first data link group identifier 142 or to the result of applying the hash function 180 to the first data link group identifier 142, as illustrative, non-limiting examples. The first data link group identifier 142 may include 48 bits. In some implementations, the result of applying the hash function 180 to the first data link group identifier 142 may include 16 bits.

The first device 110 may determine second data 152 (e.g., a second identifier) that corresponds to the first device 110. For example, the first device 110 may generate the second data 152 based on a media access control (MAC) identifier (e.g., a MAC address 160) of the first device 110. In some implementations, the MAC address 160 may include 48 bits. Additionally or alternatively, the second data 152 may include 64 bits. The first device 110 may generate the second data 152 based on the MAC address 160 in accordance with IEEE 64-bit Extended Unique Identifier (EUI-64) format.

The first device 110 may also determine a routing prefix 158. In a particular implementation (e.g., when IPv6 addresses are being used), the routing prefix 158 may be a data link routing prefix that is dedicated for data link networks. For example, in this particular implementation, the data link routing prefix may include 48 bits. The first device 110 may generate an IP address 154 based on the routing prefix 158, the first data 150, and the second data 152. For example, the first device 110 may generate the IP address 154 by combining (e.g., concatenating) the routing prefix 158, the first data 150, and the second data 152. The IP address 154 may correspond to a 128-bit IPv6 address, e.g., when the routing prefix 158 corresponds to the data link routing prefix (e.g., 48 bits), the first data 150 includes 16 bits, and the second data 152 includes 64 bits. In some implementations, a data link routing prefix may include or correspond to an NDL routing prefix that is dedicated for use in (or by) NDLs of one or more NANs.

In another particular implementation (e.g., when IPv4 addresses are being used), the routing prefix 158 may correspond to a non-globally routable prefix (e.g., 0x10). In this particular implementation, the routing prefix 158 may include 8 bits, and the first data 150 and the second data 152 combined may include 24 bits. In this implementation, the IP address 154 may include a 32-bit IPv4 address. The routing prefix 158 and the first data 150 combined may correspond to a data link subnet identifier 156. In a particular aspect, the first device 110 may generate the IP address 154 based on the data link subnet identifier 156 and the second data 152. For example, the first device 110 may generate the IP address 154 by combining (e.g., concatenating) the data link subnet identifier 156 and the second data 152. In some implementations, a data link subnet identifier may include or correspond to an NDL subnet identifier.

The IP address 154 may correspond to the first data link interface 112. The first device 110 may use the first data link interface 112 to communicate with one or more devices of the first data link group 132. To illustrate, the first device 110 may generate a first data packet having a first header and a payload. The payload may include data to be sent from the first device 110 to one or more devices of the first data link group 132. The first header may include address data that indicates the IP address 154 as a source address of (or for) the first data packet. The first device 110 may send the first data packet via the first data link interface 112 to one or more devices of the first data link group 132, such as by multicasting the first data packet.

A receiver of the first device 110 may receive a second data packet having a second header. The second header may include the IP address 154 as a destination address of (or for) the second data packet. The receiver of the first device 110 may be configured to provide the second data packet to the first data link interface 112 in response to a determination that the IP address 154 corresponds to the first data link interface 112. For example, the first device 110 may include a routing table 188 and may determine that the IP address 154 corresponds to the first data link interface 112 based on the routing table 188. The routing table 188 may include a "mapping" of IP addresses to data link interfaces. To illustrate, the routing table 188 may include data indicating that the IP address 154 corresponds (or is mapped to) the first data link interface 112. The first device 110 may update the routing table 188 when an IP address of a data link interface changes. The routing table 188 may be stored in the memory 116 or in a register of a processor of the first device 110, as illustrative, non-limiting examples.

In a particular aspect, the first header of the first data packet may include a quality of service (QoS) field (e.g., a traffic class field). The first device 110 may process the first data packet for transmission based on the QoS field. For example, the first device 110 may transmit the first data packet prior to another packet in response to determining that the QoS field of the first data packet includes QoS data that indicates a higher transmission priority than second QoS data of a second QoS field of the other packet. QoS data included in a QoS field may be used to assign data links to one or more applications, as described with reference to FIG. 2.

In a particular aspect, the first device 110 may determine whether the data link subnet identifier 156 (or the IP address 154) conflicts with an identifier of a subnet (or an IP address) used by devices of a NAN (e.g., the wireless network 101), the first data link group 132, or both. For example, the first device 110 may receive a conflict notification from another device. The conflict notification may include conflict data that indicates that the data link subnet identifier 156 (or the IP address 154) conflicts with an identifier of a subnet (or an IP address) used by the other device. The conflict notification may be responsive to a message (e.g., the first data packet) from the first device 110, the message indicating the data link subnet identifier 156, IP address 154, or both. The first device 110 may update the data link subnet identifier 156, the IP address 154, or both, in response to receiving the conflict notification.

A device may include multiple data link interfaces. For example, the second device 108 may include a first data link interface 162 and a second data link interface 164. The first data link interface 162 may correspond to the first data link group 132, and the second data link interface 164 may correspond to the second data link group 134. The second device 108 may also include data link networking circuitry 166. The data link networking circuitry 166 of the second device may be configured to operate similarly to the data link networking circuitry 114 of the first device. The data link networking circuitry 166 of the second device may be configured to perform one or more functions described herein with reference to operation of the second device 108. The second device 108 may include a memory 168. The memory 168 may store networking data 190.

The second device 108 may generate a first IP address 170 of the first data link interface 162 of the second device based on the routing prefix 158, first data that corresponds to the first data link group identifier 142, and second data that corresponds to a MAC address 178. For example, the second device 108 may generate a first subnet identifier by combining the routing prefix 158 and the first data, and the second device 108 may generate the first IP address 170 by combining the first subnet identifier and the second data that corresponds to the MAC address 178. The second device 108 may generate a second IP address 172 based on the routing prefix 158, third data (e.g., a third identifier) that corresponds to the second data link group identifier 144, and the second data that corresponds to the MAC address 178. For example, the second device 108 may generate a second subnet identifier by combining the routing prefix 158 and the third data, and the second device 108 may generate the second IP address 172 by combining the second subnet identifier and the second data.

The system 100 of FIG. 1 may enable data to be routed between devices of a data link group using IP addresses. An application of (or at) a device may be unaware of which data link interface is being used to send data to devices of a corresponding data link group and an operating system of the device may provide the correct data link interface based on an IP address. Legacy applications may be able to communicate with devices of multiple data link groups using corresponding IP addresses.

Figure 2:
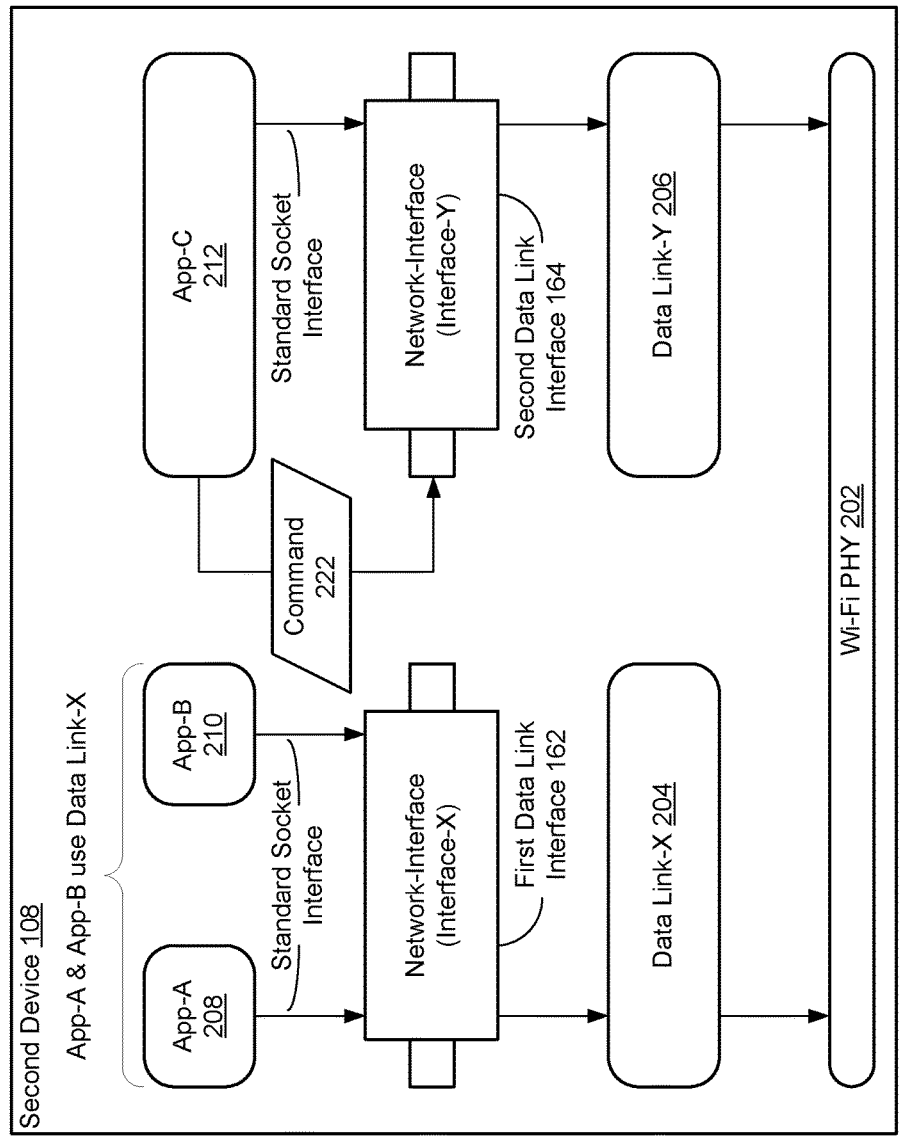
FIG. 2 is a block diagram of an illustrative example of a device of the system of FIG. 1.

Referring to FIG. 2, an illustrative example of the second device 108 is shown. The second device 108 may include a first application 208, a second application 210, and a third application 212. The first application 208 and the second application 210 may correspond to the first data link group 132. For example, the first application 208 and the second application 210 may use the first IP address 170. To illustrate, the first application 208, the second application 210, or both, may use the first IP address 170 as an address for a local socket of the second device 108. In some implementations, the first application 208, the second application 210, or both, may use a generic socket as the local socket. For example, the first application 208, the second application 210, or both, may use a socket that is not bound to a specific network interface. An operating system (OS) of the second device 108 may use a routing table to determine that the first IP address 170 maps to the first data link interface 162. The OS may, in response to the determination, direct data corresponding to the local socket (or the first IP address 170) to the first data link interface 162.

During operation, at an application layer, the first application 208, the second application 210, or both, may generate first data. At a network layer, the first data link interface 162 may generate a data packet including the first data as payload. A header of the data packet may indicate the first IP address 170 as a source address. At a data link layer, a data link-X layer 204 may generate a frame (e.g., a MAC frame) including the data packet. At a physical layer, the wireless fidelity (Wi-Fi) layer 202 may use an antenna to transmit bits corresponding to the frame via a wireless medium (e.g., air).

The third application 212 may correspond to the second data link group 134. For example, the third application 212 may use the second IP address 172. To illustrate, the third application 212 may use the second IP address 172 as an address for a local socket of the second device 108. At an application layer, the third application 212 may generate second data. At a network layer, the second data link interface 164 may generate a second data packet including the second data as payload. A header of the second data packet may indicate the second IP address 172 as a source address. At a data link layer, a data link-Y layer 206 may generate a second frame (e.g., a MAC frame) including the second data packet. At a physical layer, the wireless fidelity (Wi-Fi) layer 202 may the antenna to transmit bits corresponding to the second frame via a wireless medium (e.g., air). In some implementations the data link-X layer 204, the data link-Y layer 206, or both may include or correspond to an NDL layer.

In some implementations, an application (e.g., the first application 208, the second application 210, or the third application 212) may be configured to send commands to a lower layer (e.g., a network layer or a data link layer). A command may indicate that a new data link interface is to be created. In a particular implementation, the application may send the command to a driver or firmware (e.g., a processor executing firmware) of the lower layer. For example, the application may cause a processor or data link networking circuitry (e.g., the data link networking circuitry 114 or the data link networking circuitry 166) to send (or execute) the command to the driver or the firmware of the lower layer. The command may be configured to cause creation of a new data link interface at the lower layer of the device. To illustrate, the third application 212 may send a command 222 to the network layer. The command 222 may be configured to cause generation of the second data link interface 164 at the network layer. For example, execution of the command 222 may generate the second data link interface 164.

Additionally or alternatively, an application may send other commands. For example, a second command may indicate that a data link is to be deleted, removed, or canceled. In some implementations, the application may send the second command in response to the application going inactive, such as the application is no longer being provided or the device is no longer a consumer of the application. As another example, a third command may indicate an existing data link interface corresponding to a particular data link is to be re-used with or re-assigned to another data link. In some implementations, the existing data link interface to be re-assigned may be selected based on a QoS level, such as a QoS level indicated by the command. Alternatively, a data link interface may be re-used (or reassigned) in response to a determination that a QoS level indicated by a command (e.g., a data link generation command) is less than or equal to a QoS of a data link interface.

The second device 108 may thus enable applications 208-212 to use generic (e.g., standard) socket interfaces to send data to data link groups. For example, the generic (e.g., standard) socket interface may provide an IP address for a data link interface to an application, enabling the application to communicate with devices of a corresponding data link group.

Figure 3A:
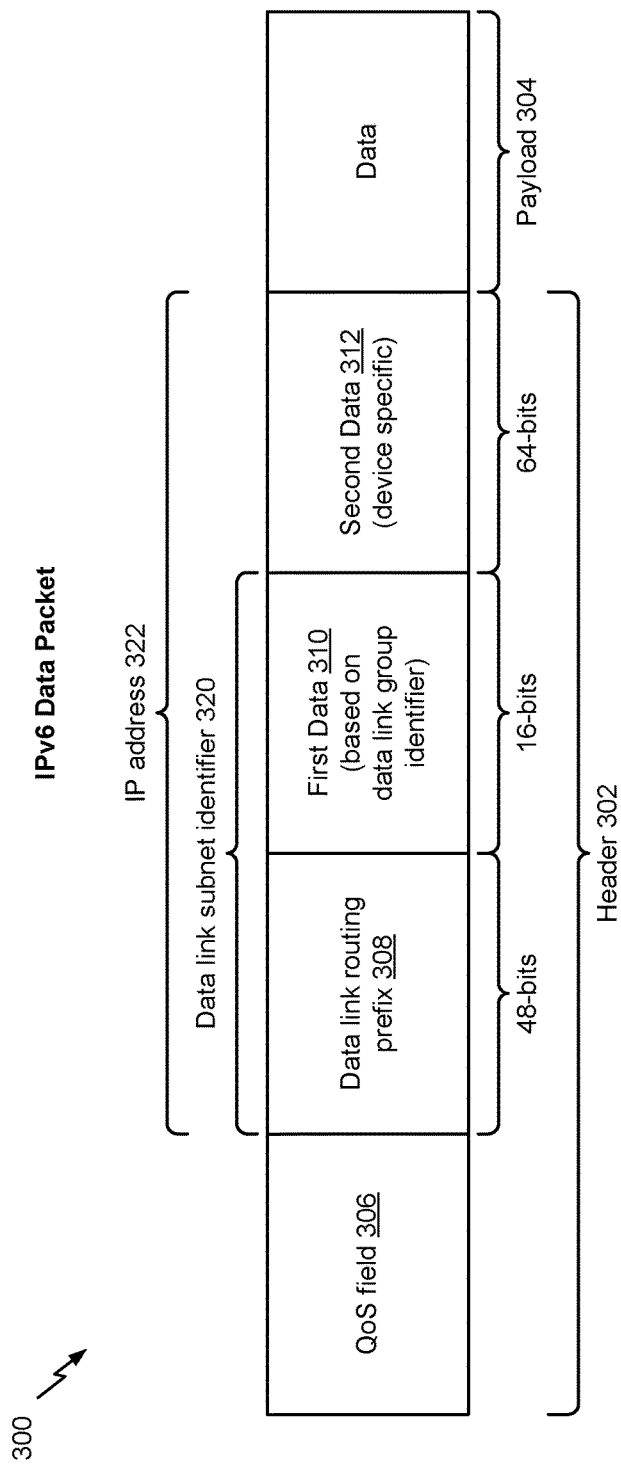
FIG. 3A is a diagram of a first illustrative example of an IP version 6 (IPv6) data packet.

Referring to FIG. 3A, an illustrative example of a data packet 300. The data packet 300 may correspond to an IPv6 data packet. In a particular aspect, the data packet 300 may be generated by one or more devices of the system 100.

The data packet 300 includes a header 302 and a payload 304. The header 302 may include a QoS field 306, as described with reference to FIG. 1. The header 302 may include a data link routing prefix 308. The data link routing prefix 308 may correspond to the routing prefix 158 of FIG. 1. For example, one or more standards (e.g., an IEEE standard) may specify one or more data link routing prefixes that are dedicated to data link networks. The data link routing prefix 308 may correspond to one of the dedicated data link routing prefixes. In some implementations, the data link routing prefix 308 may include or correspond to an NDL routing prefix.

The header 302 may include first data 310. The first data 310 may correspond to a data link group identifier (e.g., the first data link group identifier 142 or the second data link group identifier 144 of FIG. 1). In a particular implementation, the first data 310 may correspond to the first data 150 of FIG. 1. To illustrate, a device of a data link group (e.g., the first data link group 132) may generate a data link group identifier (e.g., the first data link group identifier 142) that does not conflict with data link group identifiers in use in the wireless network 101, as described with reference to FIG. 1. The device may send a discovery message to other devices of the wireless network 101. The discovery message may indicate the data link group identifier (e.g., the first data link group identifier 142). The first data 310 may be generated based on the data link group identifier (e.g., the first data link group identifier 142). For example, the first data 310 may correspond to the data link group identifier or to a result of applying a function (e.g., the hash function 180 of FIG. 1) to the data link group identifier, as described with reference to FIG. 1. In some implementations, the data link group identifier may include or correspond to an NDL group identifier.

The header 302 may include second data 312. The second data 312 may be device specific. For example, the second data 312 may correspond to a MAC identifier (e.g., a MAC address) of a device (e.g., the first device 110 or the second device 108). In a particular aspect, the second data 312 may correspond to the second data 152 of FIG. 1. In alternate implementations, the header 302 may include more than or fewer than the illustrated number of fields.

The data link routing prefix 308 and the first data 310 combined may correspond to a data link subnet identifier 320. The data link subnet identifier 320 may correspond to the data link subnet identifier 156 of FIG. 1. In some implementations, the data link subnet identifier 320 may include or correspond to an NDL subnet identifier. The data link subnet identifier 320 and the second data 312 combined may correspond to an IP address 322 (e.g., a source IP address or a destination IP address). The IP address 322 may correspond to the IP address 154, the first IP address 170, or the second IP address 172 of FIG. 1. The data link routing prefix 308 may include a first number of bits (e.g., 48 bits). The first data 310 may include a second number of bits (e.g., 16 bits). The second data 312 may include a third number of bits (e.g., 64 bits).

When a device includes multiple data link interfaces, certain types of IPv6 address generation and assignment operations by (or at) the device may result in the data link interfaces having multiple IPv6 addresses that are in the same subnet. For example, if link-local addresses are used, the IPv6 address assigned to each of the data link interfaces of (or at) the device may be part of the same subnet. During operation, an application of (or at) the device may provide a message to an operating system of the device for forwarding/routing to one of the multiple data link interfaces. However, the application may not explicitly identify the data link interface, but may rather use a socket that is not bound to any single data link interface. When link-local addresses are used (resulting in the data link interfaces being on the same subnet), the operating system may not be able to disambiguate between the data link interfaces. For example, the operating system may not be able to distinguish one data link interface from another. In such situations, the operating system may drop the message. It would therefore be beneficial for the IPv6 addresses that a device assigns to its data link interfaces to be distinguishable at the subnet level.

Figure 3B:
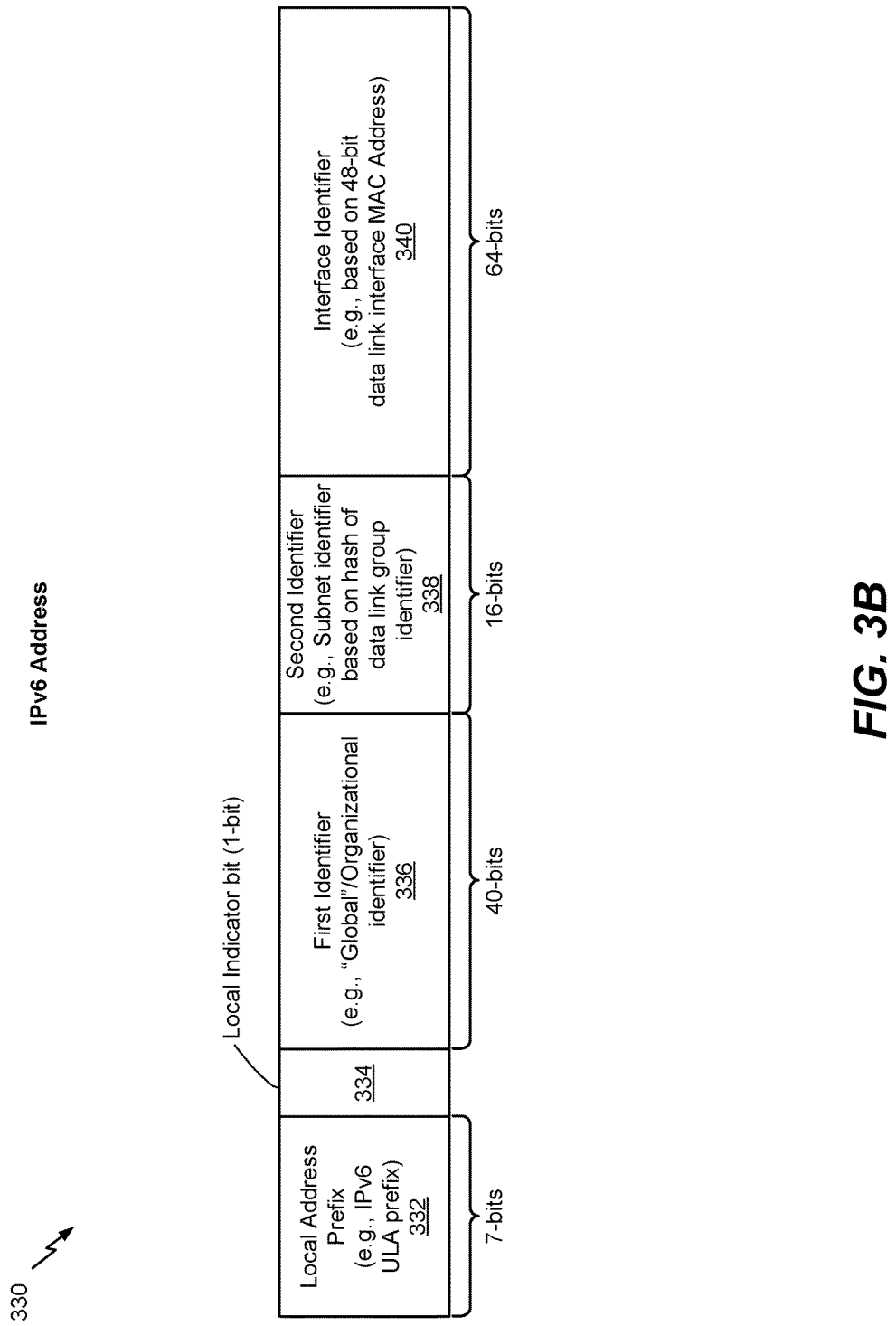
FIG. 3B is a diagram of a first illustrative example of an IPv6 address.

Referring to FIG. 3B, a particular illustrative example of an IPv6 address 330 that can be distinguished at the subnet level is shown. In an illustrative aspect, the IPv6 address 330 may be generated by a device (e.g., the first device 110 or the second device 108) and assigned to a data link interface of the device (e.g., the data link interfaces 112, 162, or 164 of FIG. 1). For example, the IPv6 address 330 may be used in a data packet in place of the IP address 322 of FIG. 3A.

In a particular aspect, the IPv6 address 330 is a 128-bit address in which a first (e.g., initial) seven bits are a local address prefix 332. The local address prefix 332 may be a non-globally routable address prefix. In an illustrative example, the local address prefix 332 is an IPv6 unique local address (ULA) prefix in the "fc00::/7" block, such as "fd00::/8" or "fc00::/8." In some aspects, an IPv6 address having an IPv6 ULA prefix is unique within an organization (e.g., a business, a corporate entity, a private network, etc.) but is not guaranteed to be globally unique. Thus, an IPv6 address having an IPv6 ULA prefix may be suitable for local communication within an organization. In a particular aspect, the local address prefix 332 may be an IPv6 ULA prefix as described in Request for Comments (RFC) 4193. Additionally, the IPv6 address having the IPv6 ULA prefix may be assigned by a registration entity and may be unique across organizations that operate in accordance with the registration entity.

In a particular aspect, a bit that sequentially follows the local address prefix 332 is a local indicator bit 334. The local indicator bit 334 may indicate whether the IPv6 address 330 is locally assigned. In a particular example, the local indicator bit 334 may have a first value (e.g., 1) when the local address prefix 332 is an IPv6 ULA prefix, indicating that the IPv6 address 330 is locally assigned.

In a particular aspect, forty bits that sequentially follow the local indicator bit 334 are a first identifier 336. In an illustrative example, the first identifier 336 corresponds to (e.g., maps to) an organization, such as a business, a corporate entity, a private network, etc. The first identifier 336 may be a "global" identifier that is "unique" to a particular organization. For example, the "mapping" between an organization and its "global" identifier may be recorded in a registration database or other public information source, so that other organizations can select different "global" identifiers to avoid conflicts. It will be appreciated that when the first identifier 336 is globally unique, a combination of the local address prefix 332, the local indicator bit 334, and the first identifier 336 may also be globally unique. For example, the combination of the local address prefix 332, the local indicator bit 334, and the first identifier 336 may correspond to a "globally unique" prefix (for a particular organization) that is recorded by a registration entity, such as a wireless standards organization (e.g., Wi-Fi Alliance), an IPv6 deployment and tunnel broker, etc.

In a particular aspect, sixteen bits that sequentially follow the first identifier 336 are a second identifier 338. The second identifier 338 may be a subnet identifier that identifies a subset within an organization or a website. In some examples, the second identifier 338 is generated by applying a hash function (e.g., the hash function 180 of FIG. 1) to a data link group identifier. The data link group identifier and the hash of the data link group identifier may be unique within a NAN or a NAN cluster. Thus, the second identifier 338 may be a subnet identifier that differs between different data link interfaces of the same device, because the data link interfaces may correspond to different data link group identifiers.

In a particular aspect, the sixty-four bits of the IPv6 address 330 that sequentially follow the second identifier 338 are an interface identifier 340. In one example, the interface identifier 340 of a data link interface is generated based on a MAC address (e.g., a forty-eight bit MAC address) of the data link interface, a MAC of the device including the data link interface, a MAC address for a hardware networking component of the device, etc. To illustrate, a forty-eight bit MAC address for the data link interface may be used to generate the sixty-four bit interface identifier 340 by converting the MAC address to an IEEE EUI-64 format.

In a particular aspect, the conversion process may include dividing the MAC address into two twenty-four bit halves and inserting a sixteen bit value between the two halves. In one example, the sixteen bit value is 0xFFFE, which may be a reserved value for EUI-64s generated from MAC addresses. In some examples, after inserting the sixteen bit value, a universal/local (U/L) bit in the EUI-64 may be flipped to indicate that the EUI-64 is not globally unique. Alternatively, the U/L bit may not be flipped, indicating that the EUI-64 is an interface identifier.

Figure 3C:
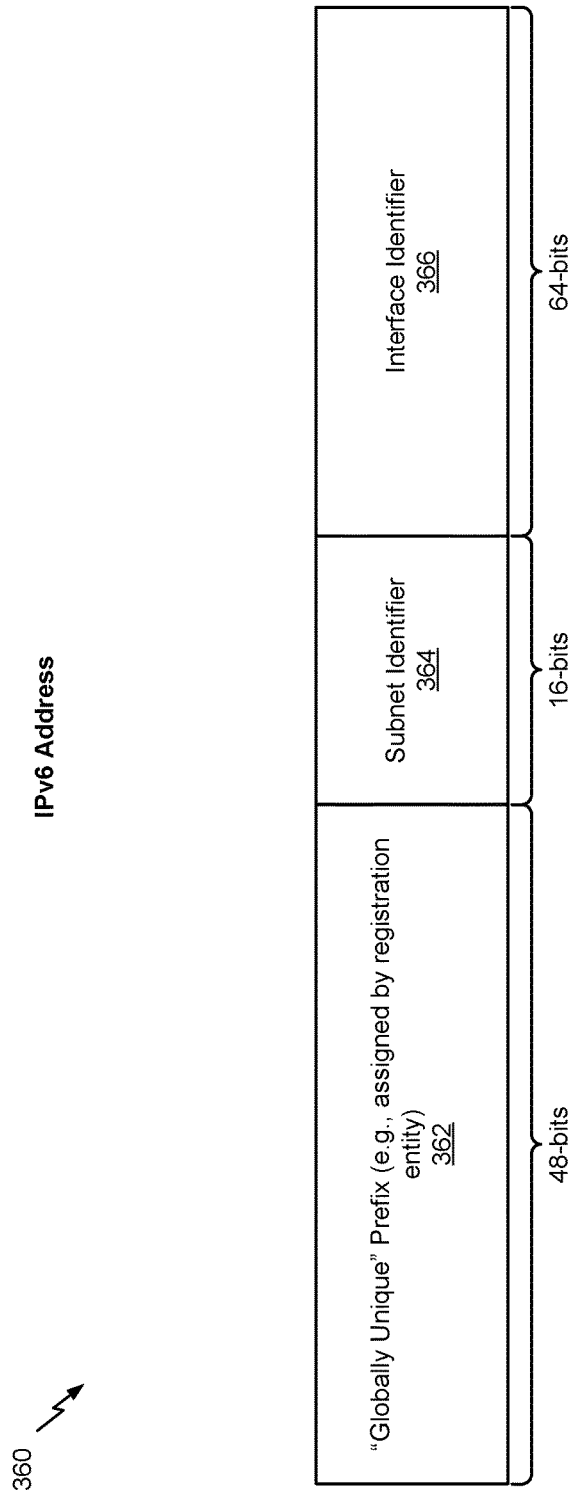
FIG. 3C is a diagram of a second illustrative example of an IPv6 address.

Referring to FIG. 3C, another example of an IPv6 address 360 is shown. The IPv6 address 360 includes a "globally unique" prefix 362, a subnet identifier 364, and an interface identifier 366. In an illustrative example, the subnet identifier 364 is the sixteen bit second identifier 338 of FIG. 3B and the interface identifier 366 is the sixty-four bit interface identifier 340 of FIG. 3B. In an illustrative aspect, the IPv6 address 360 may be included in a data packet in place of the IP address 322 of FIG. 3A.

The globally unique prefix 362 may correspond to a combination (e.g., concatenation) of a local address prefix (e.g., the local address prefix 332 of FIG. 3B), a local indicator bit (e.g., the local indicator bit 334 of FIG. 3B), and an organizational identifier (e.g., the first identifier 336 of FIG. 3B). In a particular aspect, the forty-eight bit globally unique prefix 362 may be recorded by a registration entity, such as a wireless networking standard, an IPv6 deployment and broker, etc. In some aspects, the globally unique prefix 362 may be unique within an organization (e.g., a business, a corporate entity, a private network, etc.) or within organizations that operate in accordance with the registration entity, but the globally unique prefix 362 may not be guaranteed to be globally unique.

FIGS. 3B and 3C thus illustrate alternative IPv6 addresses that may be generated by a device and assigned to a data link interface of the device. When an IPv6 address having a format as described with reference to FIG. 3B or 3C is used, an application may be able to use an unbound socket to provide messages to an operating system, and the operating system may be able to determine which specific data link interface to forward the message to. For example, the operating system may consult a local routing table to match a prefix (e.g., first forty-eight or sixty-four bits) of a destination address in the message to a prefix of a local data link interface.

Figure 4:
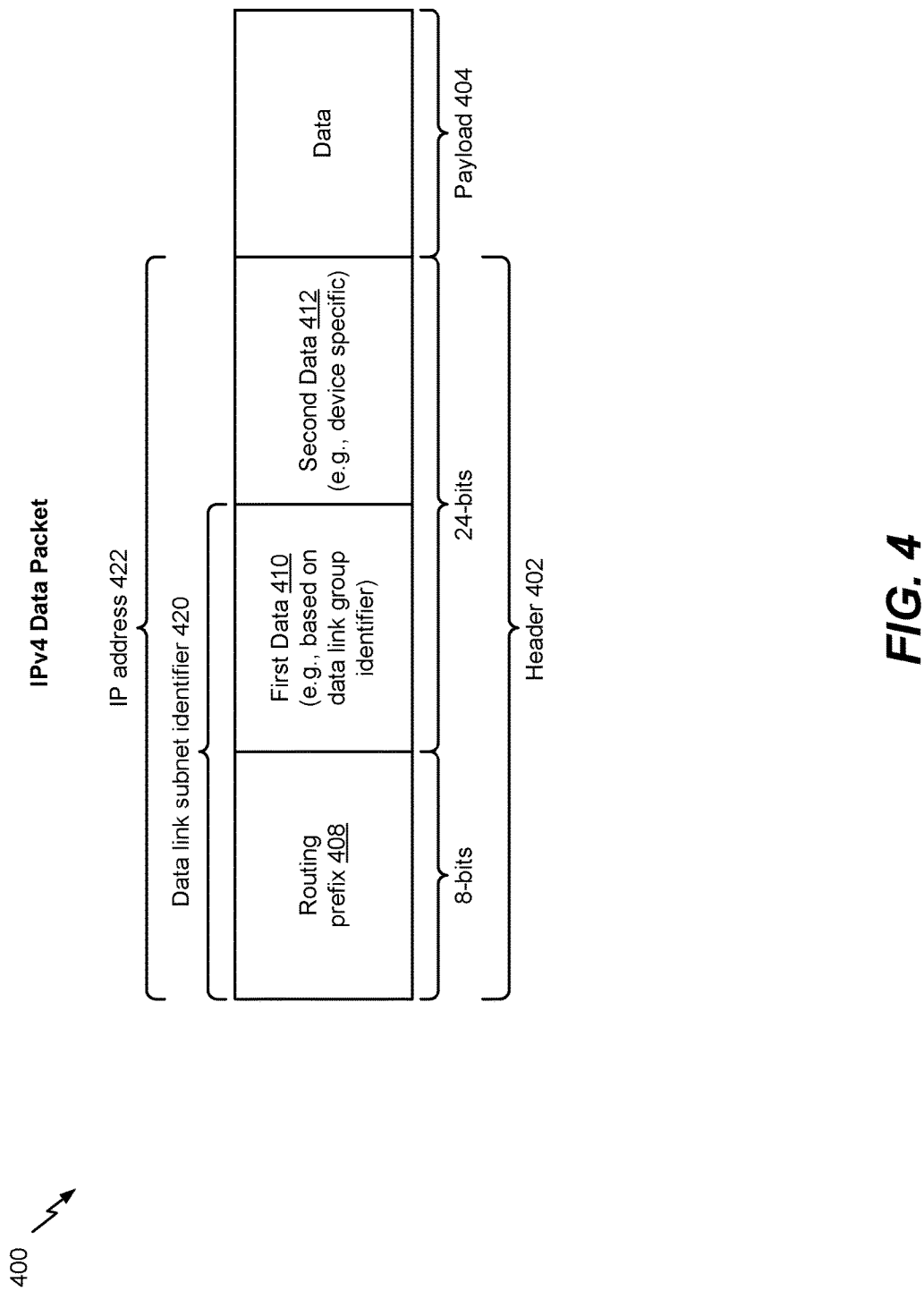
FIG. 4 is a diagram of an illustrative example of an IP version 4 (IPv4) data packet.

Referring to FIG. 4, an illustrative example of a data packet 400 is shown. The data packet 400 may correspond to an IPv4 data packet. In a particular aspect, the data packet 300 may be generated by one or more devices of the system 100.

The data packet 400 includes a header 402 and a payload 404. The header 402 may include a routing prefix 408. The routing prefix 408 may correspond to the routing prefix 158 of FIG. 1. For example, the routing prefix 408 may be a non-globally routable prefix. To illustrate, one or more organizations (e.g., Internet Engineering Task Force (IETF) or IEEE) may specify that a range of prefixes (e.g., IPv4 address prefixes) are non-globally routable or are allocated for private internets, such as IETF RFC 1918 prefixes. The routing prefix 408 may be included in the range of prefixes.

The header 402 may include first data 410. The first data 410 may correspond to a data link group identifier (e.g., the first data link group identifier 142 or the second data link group identifier 144). For example, the first data 410 may be the first data 150 of FIG. 1. To illustrate, a device of a data link group (e.g., the first data link group 132) may generate a data link group identifier (e.g., the first data link group identifier 142) that does not conflict with data link group identifiers in use in the wireless network 101, as described with reference to FIG. 1. The device may send a discovery message to other devices of the wireless network 101. The discovery message may indicate the data link group identifier (e.g., the first data link group identifier 142). The first data 310 may be generated based on the data link group identifier (e.g., the first data link group identifier 142 of FIG. 1). In a particular implementation, the first data 310 may correspond to the data link group identifier or to a result of applying a function (e.g., the hash function 180 of FIG. 1) to the data link group identifier as described with reference to FIG. 1. In some implementations, the data link group identifier may include or correspond to an NDL group identifier.

The header 402 may include second data 412. The second data 412 may be device specific. For example, the second data 412 may correspond to a MAC identifier (e.g., a MAC address) of a device (e.g., the first device 110 or the second device 108). In a particular aspect, the second data 412 may correspond to the second data 152 of FIG. 1. In alternate implementations, the header 402 may include more than or fewer than the illustrated number of fields.

The routing prefix 408 and the first data 410 combined may correspond to a data link subnet identifier 420. The data link subnet identifier 420 may correspond to the data link subnet identifier 156 of FIG. 1. In some implementations, the data link subnet identifier 420 may include or correspond to an NDL subnet identifier. The data link subnet identifier 420 and the second data 412 combined may correspond to an IP address 422 (e.g., a source IP address or a destination IP address). The IP address 422 may correspond to the IP address 154, the first IP address 170, or the second IP address 172 of FIG. 1. The routing prefix 408 may include a first number of bits (e.g., 8 bits). The first data 410 and the second data 412 combined may include a second number of bits (e.g., 24 bits).

Since the routing prefix 408 may be used by non-data link devices (e.g., Wi-Fi access points), the data link subnet identifier 420 may not be unique within a NAN or a data link group (e.g., the first data link group 132 or the second data link group 134). For example, another device may have an infrastructure connection that uses a subnet identifier that matches the data link subnet identifier 420. The data link subnet identifier 420 may be updated by using a collision avoidance scheme. For example, the other device may send a conflict notification indicating a conflict with the data link subnet identifier 420, e.g., in response to receiving a message (such as an address resolution protocol (ARP) message) indicating the data link subnet identifier 420. A device (e.g., the first device 110) that generated the data link subnet identifier 420 may update the data link subnet identifier 420 in response to receiving the conflict notification. For example, the conflict notification may indicate one or more non-globally routable prefixes that are in use at the other device. The first device 110 may maintain prefix data indicating non-globally routable prefixes that have been recently detected as in use. The first device 110 may update the data link subnet identifier 420 to correspond to a routing prefix that is not indicated by the prefix data as being in use or having been recently detected as being in use.

In a particular implementation, the first device 110 may receive messages (e.g., conflict notifications) from multiple devices of the first data link group 132 indicating non-globally routable prefixes that are in use by (or at) the devices. The first device 110 may update a value of the data link subnet identifier 420 to correspond to a routing prefix that is not indicated in the messages. In an alternate implementation, the first device 110 may send a message including proposed routing prefixes to devices of the first data link group 132 and may receive replies from the devices that indicate whether there is a conflict with each of the proposed routing prefixes. The first device 110 may update the data link subnet identifier 420 to correspond to a proposed routing prefix that has a fewest number of conflicts or no conflicts as indicated by the replies.

Figure 5:
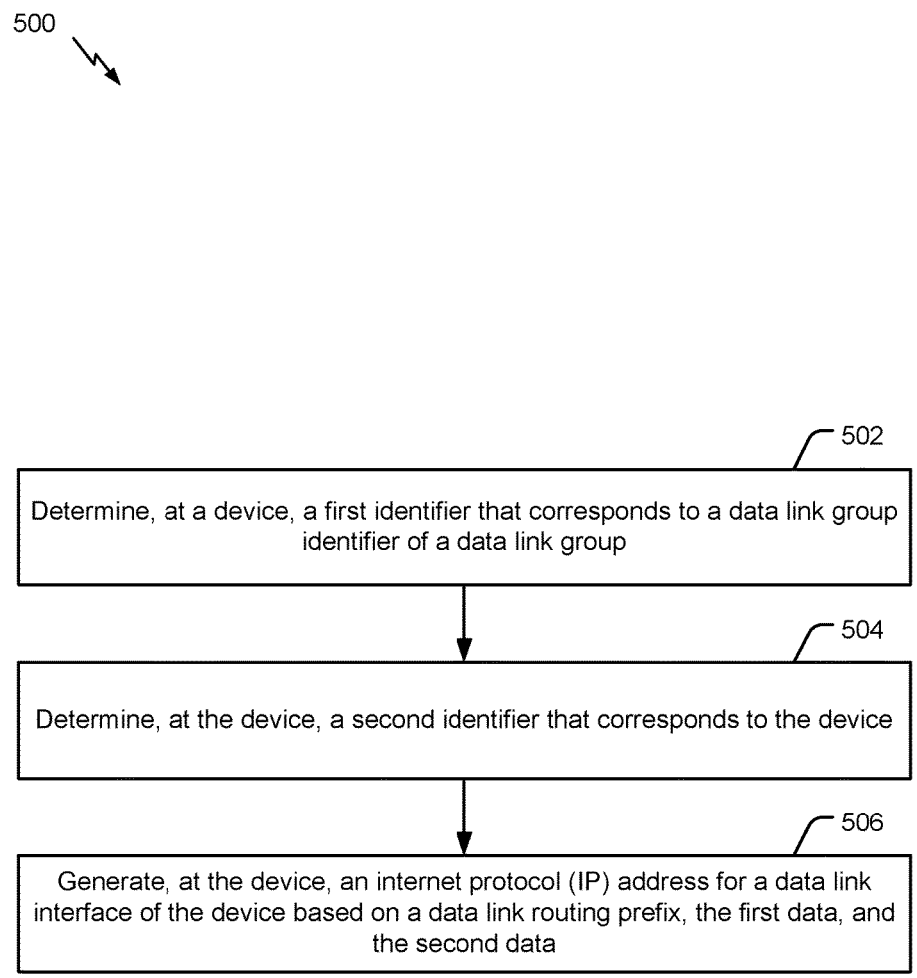
FIG. 5 is a flow chart to illustrate an example of a method of data link interface IP address generation.

Referring to FIG. 5, an example of a method 500 of data link interface IP address generation is shown. The method 500 may be performed by one or more devices of the system 100 of FIG. 1.

The method 500 includes determining, by a device, a first identifier that corresponds to a data link group identifier of a data link group, at 502. For example, the first device 110 may determine the first data 150 that corresponds to the first data link group identifier 142, as described with reference to FIG. 1. To illustrate, the first data 150 may correspond to the first data link group identifier 142 or to a result (e.g., 16 bits) of applying a function (e.g., the hash function 180) to the first data link group identifier 142, as described with reference to FIG. 1. As another example, the first identifier may include or correspond to the first data 310 of FIG. 3A, the second identifier 338 of FIG. 3B, the subnet identifier 364 of FIG. 3C, or the first data 410 of FIG. 4.

The method 500 also includes determining, by the device, a second identifier that corresponds to the device, at 504. For example, the first device 110 may determine the second data 152 that corresponds to the first device 110, as described with reference to FIG. 1. To illustrate, the second data 152 (e.g., 64 bits) may be generated based on the MAC address 160, as described with reference to FIG. 1. As another example, the second identifier may include or correspond to the second data 312 of FIG. 3A, the interface identifier 340 of FIG. 3B, the interface identifier 366 of FIG. C, or the second data 412 of FIG. 4.

The method 500 further includes generating, by the device, an internet protocol (IP) address for a data link interface of the device by combining a data link routing prefix, the first data, and the second data, at 506. For example, the first device 110 may generate the IP address 154 of the first data link interface 112 by concatenating the routing prefix 158, the first data 150, and the second data 152, as described with reference to FIG. 1. As another example, the data link routing prefix may include or correspond to the data link routing prefix 308 of FIG. 3A, the globally unique prefix 362 of FIG. 3C, or the routing prefix 408. In some implementations, the data link routing prefix may correspond to an NDL routing prefix (e.g., a 48-bit prefix) that is dedicated for use by NDL networks.

In some implementations, the method 500 may include sending a first data packet from the device to one or more devices of the data link group based on the IP address for the data link interface of the device. For example, the first data packet may include or correspond to the first data packet of FIG. 1, the data packet 300 of FIG. 3A, or the data packet 400 of FIG. 4. The method 500 may also include receiving a second data packet from a second device of the one or more devices of the data link group based on the IP address for the data link interface of the device. For example, the first device 110 may send the first data packet to one or more devices of the first data link group 132 and may receive the second data packet from the second device 108.

In some implementations, the method 500 may include applying a hash function to the data link group identifier to determine the first identifier. In some implementations, the data link group may correspond to a neighbor aware network data link (NDL) group of a neighbor aware network (NAN), the data link group identifier may be unique within the NAN.

In some implementations, the method 500 may include combining, by the device, the first identifier with the data link routing prefix to generate a data link subnet identifier. For example, the data link subnet identifier may include or correspond to the data link subnet identifier 320 of FIG. 3A or the data link subnet identifier 420 of FIG. 4. In a particular implementation, the method 500 may further include combining (e.g., concatenating), by the device, the data link subnet identifier and the second identifier to generate an address, such as an IP address. The IP address may correspond to an IP version 6 (IPv6) address or an IP version 4 (IPv4) address.

In some implementations, the method 500 may include determining whether the data link subnet identifier conflicts with an identifier of a subnet used by devices of a data link network. The method 500 may also include updating the data link subnet identifier in response to determining that the data link subnet identifier conflicts with the identifier of the subnet used by the devices of the data link network.

In some implementations, the method 500 may include receiving a conflict notification from a second device, the conflict notification including conflict data that indicates the data link subnet identifier is in use by another device. The method 500 may also include determining that the data link subnet identifier conflicts with the identifier of the subnet used by the devices of the data link network in response to receiving the conflict notification. In a particular implementation, a device may generate and send a conflict message in response to detecting or determining a conflict.

In some implementations, the method 500 may include determining, by the device, a local address prefix. For example, the local address prefix may include or correspond to the local address prefix 332 of FIG. 3B. The method 500 may also include determining, by the device, a third identifier that corresponds to an organization, where the data link routing prefix includes the local address prefix, a local indicator bit, and the third identifier. For example, the local indicator bit may include or correspond to the local indicator bit 334 and the third identifier may include or correspond to the first identifier 336 of FIG. 3B. In a particular implementation, the local address prefix corresponds to an IP version 6 (IPv6) unique local address (ULA) prefix or an IP version 4 (IPv4) prefix according to Internet Engineering Task Force Request for Comments 1918.

In some implementations, the method 500 may include generating, by an application of the device, a first command. The first command may instruct the device to generate a second data link interface. For example, the application may include or correspond to the first application 208, the second application 210, or the third application 212 of FIG. 2. The second data link interface may include or correspond to the second data link interface 164 of FIGS. 1 and 2. The method 500 may also include generating, at the device, the second data link interface in response to executing the first command. The second data link interface may correspond to a second IP address and a second data link group. The method 500 may include, in response to executing a second command, assigning a third IP address to the second data link interface. The second data link interface may correspond to a third data link group. The method 500 may further include removing (or deleting) the second data link interface in response to executing a third command at the device. For example, a processor may generate the second data link interface 164, assign the second data link interface 164, and delete the second data link interface 164, at the network layer, as described with reference to FIG. 2.

In some implementations, the data link interface may be configured to send a first data packet to one or more devices of the data link group. A header of the first data packet may include address data that indicates the IP address for the data link interface as a source address of the first data packet. For example, the header may include or correspond to the header 302 of FIG. 3A or the header 402 of FIG. 4.

In some implementations, a receiver may be coupled to the processor and the receiver may be configured to receive a second data packet from a second device of the data link group. For example, the receiver may include or correspond to the receiver of the first device 110 of FIG. 1. A second header of the second data packet may include second address data that indicates the IP address for the data link interface as a destination address of the second data packet. The receiver may also provide the second data packet to the data link interface based on the IP address included in the second data packet.

In some implementations, the method 500 may include generating a second data interface at the device. For example, the second data interface may include or correspond to the second data link interface 164 of FIG. 1 or FIG. 2. The method 500 may also include determining a third identifier that corresponds to a second data link group identifier of a second data link group. For example, the third identifier may include or correspond to the second data link group identifier 144 of FIG. 1. The method 500 may include determining a fourth identifier based on a second MAC identifier of the device. The fourth identifier, the second MAC identifier, or both, may include or correspond to the MAC address 178 of FIG. 1. The method 500 may further include generating a second IP address for the second data link interface based on a combination of the data link routing prefix, the third identifier, and the fourth identifier. For example, the second IP address may include or correspond to the second IP address 172 of FIG. 1.

In some implementations, the IP address includes a 128-bit IP version 6 (IPv6) address in which a first seven bits indicate the local address prefix and a bit that sequentially follows the local address prefix includes the local indicator bit, where the local indicator bit has a first value that indicates the IPv6 address is locally assigned. The IP address further includes forty bits that sequentially follow the local indicator bit indicate a fifth identifier, sixteen bits that sequentially follow the fifth identifier indicate the first identifier, and sixty-four bits that sequentially follow the first identifier indicate the second identifier. For example, the fifth identifier may include or correspond to the first identifier 336 of FIG. 3B.

The method 500 may enable generation of an IP address (e.g., a 128-bit IPv6 address) for a data link interface. The generated IP address may be based on a data link routing prefix that is dedicated to data link networks. The generated IP address may be unique within the first data link group 132. The method 500 may enable a device of a data link group to generate a unique IP address and to conserve resources that would have been used to detect conflicts with non-unique IP addresses. Additionally, the method 500 may enable a device to generate and to assign unique IP addresses for each data link interface of multiple data link interfaces of the device.

Figure 6:
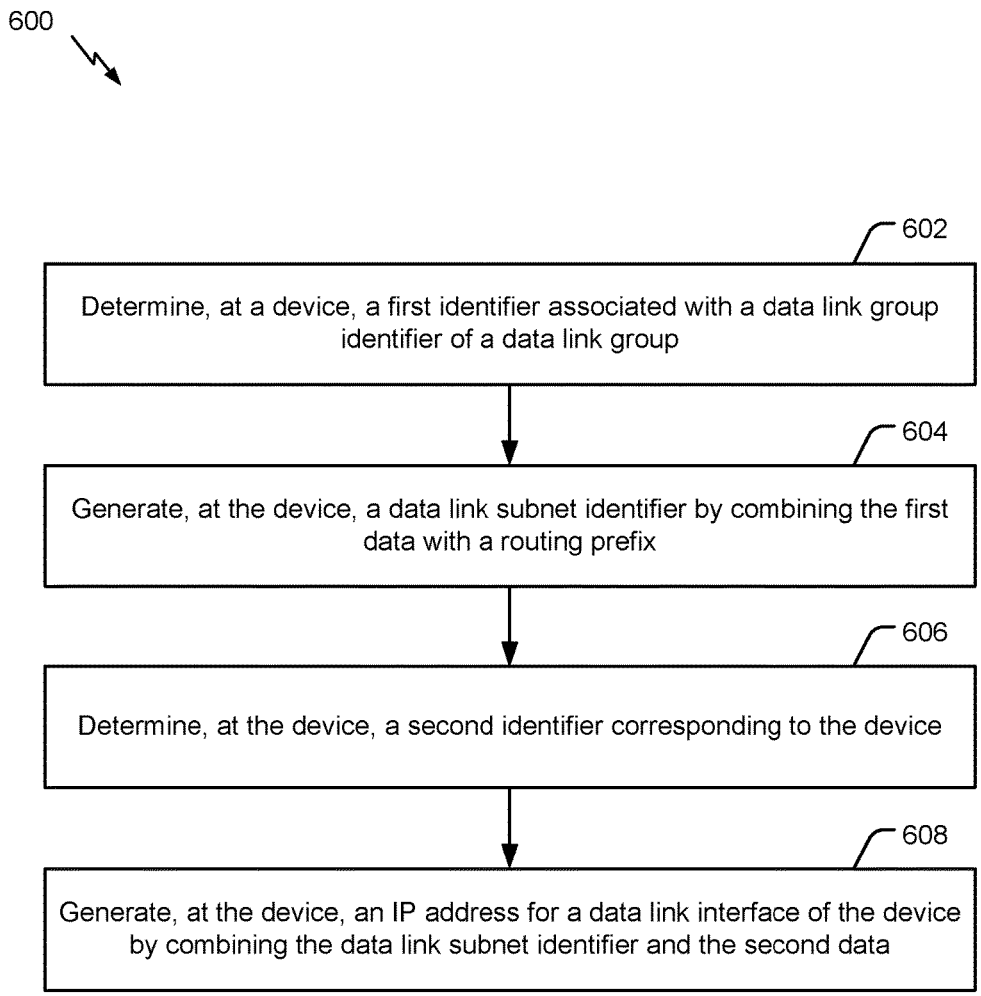
FIG. 6 is a flowchart to illustrate another example of a method of data link interface IP address generation.

Referring to FIG. 6, another example of a method 600 of data link interface IP address generation is shown. The method 600 may be performed by one or more devices of the system 100 of FIG. 1.

The method 600 includes determining, by a device, a first identifier that corresponds to a data link group identifier of a data link group, at 602. For example, the first device 110 may determine the first data 150 that corresponds to the first data link group identifier 142 of the first data link group 132, as described with reference to FIG. 1. To illustrate, the first data 150 may correspond to the first data link group identifier 142 or to a result of applying a function (e.g., the hash function 180) to the first data link group identifier 142.

The method 600 also includes generating, by the device, a data link subnet identifier by combining the first data with a routing prefix, at 604. For example, the first device 110 may generate the data link subnet identifier 156 by combining (e.g., concatenating) the first data 150 with the routing prefix 158, as described with reference to FIG. 1. To illustrate, the routing prefix 158 (e.g., 8 bits) may correspond to a non-globally routable prefix.

The method 600 further includes determining, by the device, a second identifier that corresponds to the device, at 606. For example, the first device 110 may determine the second data 152 that corresponds to the first device 110. To illustrate, the second data 152 may be generated based on the MAC address 160.

The method 600 also includes generating, by the device, an IP address (e.g., an IPv4 address) for a data link interface of the device by combining the data link subnet identifier and the second data, at 608. For example, the first device 110 may generate the IP address 154 of the first data link interface 112 by combining (e.g., concatenating) the data link subnet identifier 156 and the second data 152, as described with reference to FIG. 1.

The method 600 may enable generation of an IP address for a data link interface. The IP address may be used by an application of the first device 110 to communicate with one or more devices of the first data link group 132. The method 600 may enable a device of a data link group to generate a unique IP address and to conserve resources that would have been used to detect conflicts with non-unique IP addresses.

Figure 7:
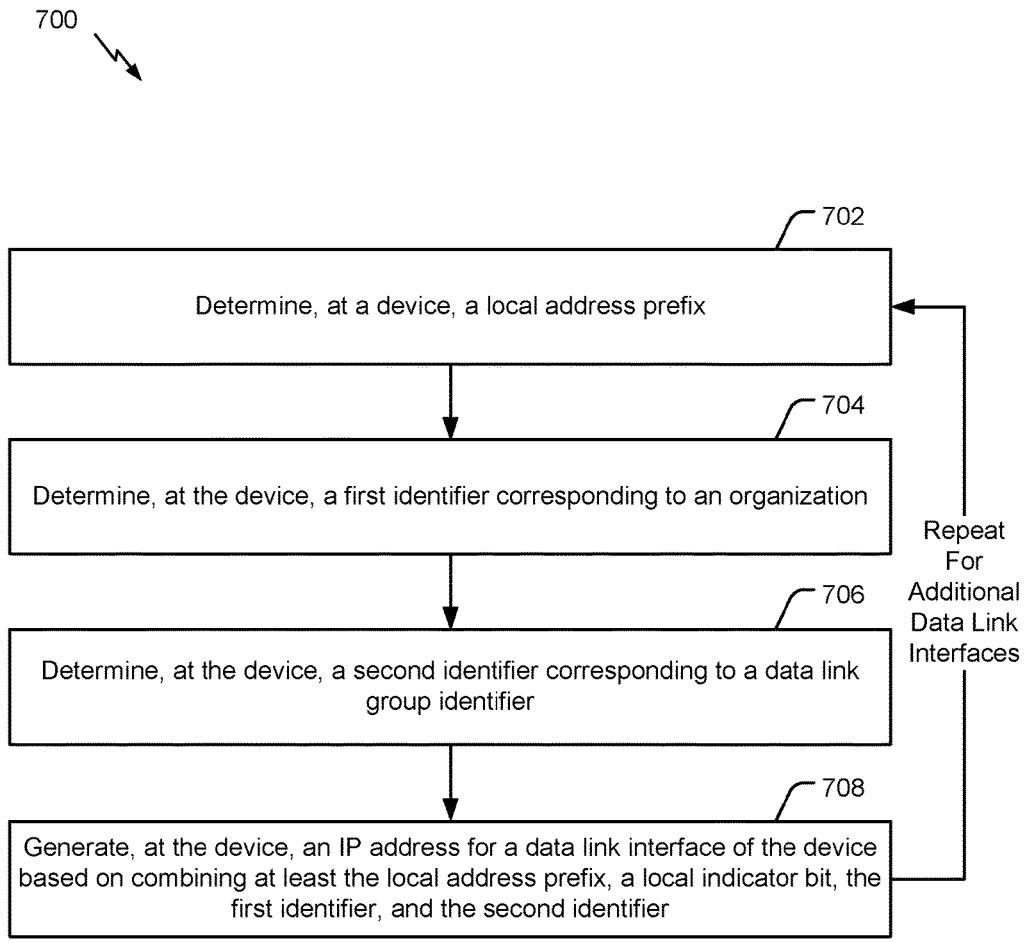
FIG. 7 is a flowchart to illustrate another example of a method of data link interface IP address generation.

Referring to FIG. 7, another example of a method 700 of data link interface IP address generation is shown. The method 700 may be performed by one or more devices of the system 100 of FIG. 1.

The method 700 includes determining, by a device, a local address prefix, at 702. For example, the first device 110 may determine a local address prefix, such as the local address prefix 332 of FIG. 3B. In a particular aspect, the local address prefix is an IPv6 ULA prefix.

The method 700 also includes determining, by the device, a first identifier that corresponds to an organization, at 704, and a second identifier that corresponds to a data link group identifier, at 706. For example, the first device 110 may determine the first identifier 336 of FIG. 3B and the second identifier 338 of FIG. 3B. In a particular aspect, the first identifier may be a forty bit identifier and the second identifier may be a sixteen bit subnet identifier that is determined by applying a hash function (e.g., the hash function 180 of FIG. 1) to a data link group identifier.

The method 700 further includes generating, by the device, an IP address for a data link interface of the device based on combining at least the local address prefix, a local indicator bit, the first identifier, and the second identifier, at 708. For example, the first device 110 may determine the IPv6 address 330 of FIG. 3B or the IPv6 address 360 of FIG. 3C by combining (e.g., concatenating) at least the local address prefix, a local indicator bit, the first identifier, and the second identifier. The method 700 may be repeated to generate IP addresses for additional data link interface(s) of the device. For example, the method 700 may be repeated to generate a second IP address for a second data link interface by combining (e.g., concatenating) at least the local address prefix, a local indicator bit, the first identifier, and the second identifier. The second IP address may include a second interface identifier of the second data link interface, which in some examples may differ from a first interface identifier of the first data link interface. In alternative examples, multiple data link interfaces of a device may have the same forty-eight bit MAC address, and therefore may have the same sixty-four bit data link interface identifier. However, even when these lower sixty-four bits of the IPv6 addresses are the same, the IPv6 addresses as a whole may nonetheless be different, because the sixty-four upper (e.g., prefix) bits of the IPv6 addresses may differ due to the use of different data link group identifiers to determine the respective subnet identifiers in the IPv6 addresses.

The method 700 may thus enable generation of an IP address for a data link interface. For example, the IP address may be used by an application of the first device 110 to communicate with one or more devices of the first data link group 132. The method 700 may enable a device of a data link group to generate a unique IP address and to conserve resources that would have been used to detect conflicts with non-unique IP addresses.

In particular aspects, the methods of FIGS. 5-7 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, one or more of the methods of FIGS. 5-7, individually or in combination, may be performed by a processor that executes instructions, as described with respect to FIG. 8. To illustrate, a portion of one of the methods FIGS. 5-7 may be combined with a second portion of one of the methods of FIGS. 5-7. Additionally, one or more portions described with reference to the FIGS. 5-7, may be optional, may be performed at least partially concurrently, may be performed in a different order than shown or described, or a combination thereof.

Figure 8:
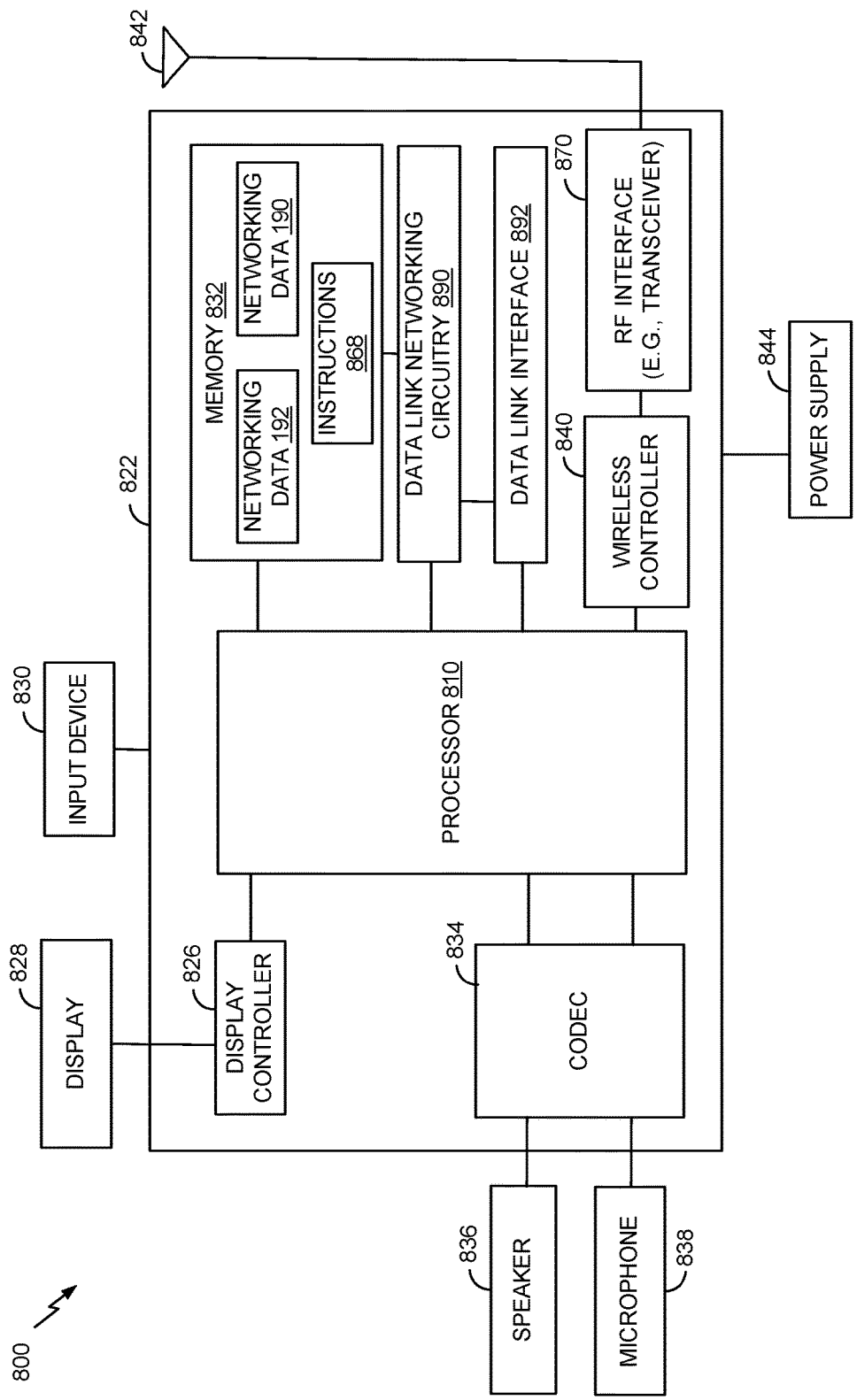
FIG. 8 is a block diagram of a device operable to perform data link interface IP address generation in accordance with the systems and methods of FIGS. 1-7.

Referring to FIG. 8, an illustrative example of a wireless communication device 800 is shown. The device 800 may correspond to at least one of the devices (e.g., the first device 110, the second device 108, or both) of the system 100 of FIG. 1.

The device 800 includes a processor 810 (e.g., a digital signal processor (DSP) or a central processing unit (CPU)) coupled to a memory 832. The memory 832 may correspond to the memory 168, the memory 116, or both, of FIG. 1. For example, the memory 832 may include the networking data 190, the networking data 192, or both. The memory 832 may include instructions 868. The processor 810 may be coupled to, or may include, the data link networking circuitry 890. The data link networking circuitry 890 may be configured to perform one or more operations of the methods, devices, and systems described herein. The data link networking circuitry 890 may correspond to the data link networking circuitry 114, the data link networking circuitry 166 of FIG. 1, or both. The processor 810, the data link networking circuitry 890, or both, may be coupled to a data link interface 892. The data link interface 892 may correspond to the first data link interface 112, the first data link interface 162, the second data link interface 164, or a combination thereof.

In a particular aspect, the data link networking circuitry 890 may be configured to determine the first data 150 that corresponds to the first data link group identifier 142, as described with reference to FIG. 1. The data link networking circuitry 890 may be configured to determine the second data 152 that corresponds to the device 800, as described with reference to FIG. 1. The data link networking circuitry 890 may be configured to generate the IP address 154 of the data link interface 892 by combining the routing prefix 158, the first data 150, and the second data 152, as described with reference to FIG. 1.

In a particular aspect, the data link networking circuitry 890 may be configured to determine the local address prefix 332, the local indicator bit 334, the first identifier 336, the second identifier 338, and the interface identifier 340, as described with reference to FIG. 3B. The data link networking circuitry 890 may be configured to combine the local address prefix 332, the local indicator bit 334, the first identifier 336, the second identifier 338, and the interface identifier 340 to generate the IPv6 address 330 of FIG. 3B. Alternatively, or in addition, the data link networking circuitry 890 may be configured to determine the globally unique prefix 362, the subnet identifier 364, and the interface identifier 366, as described with reference to FIG. 3C. The data link networking circuitry 890 may be configured to combine the globally unique prefix 362, the subnet identifier 364, and the interface identifier 366 to generate the IPv6 address 360 of FIG. 3C.

In a particular implementation, the data link networking circuitry 890 may be implemented on-chip, such as via the processor 810. For example, the memory 832 may be a computer-readable storage device (e.g., a non-transitory computer-readable medium) storing computer-executable instructions 868 that are executable by the processor 810 to cause the processor 810 to perform operations of the data link networking circuitry 890. For example, the processor 810 may determine the first data 150, may determine the second data 152, and may generate the IP address 154 by combining the routing prefix 158, the first data 150, and the second data 152, as described with reference to FIG. 1. As another example, the processor 810 may determine the local address prefix 332, the local indicator bit 334, the first identifier 336, the second identifier 338, and the interface identifier 340, and may generate the IPv6 address by combining the local address prefix 332, the local indicator bit 334, the first identifier 336, the second identifier 338, and the interface identifier 340. Alternatively, or in addition, the processor 810 may determine the globally unique prefix 362, the subnet identifier 364, and the interface identifier 366, and may combine the globally unique prefix 362, the subnet identifier 364, and the interface identifier 366 to generate the IPv6 address 360.

FIG. 8 also shows a display controller 826 that is coupled to the processor 810 and to a display 828. A coder/decoder (CODEC) 834 can also be coupled to the processor 810. A speaker 836 and a microphone 838 can be coupled to the CODEC 834.

FIG. 8 also indicates that a wireless controller 840 can be coupled to the processor 810 and, via a radio frequency (RF) interface 870, to an antenna 842. In an illustrative example, one or more of the wireless controller 840, the RF interface 870, or the antenna 842 correspond to a data link interface, such as the data link interfaces 162, 164, or 112 of FIG. 1. In particular aspects, a data link interface (e.g., an NDL interface) may correspond to hardware, software, a virtual interface, or a combination thereof. To illustrate the data link interfaces 162, 164 at the second device 108 may have shared access, arbitrated access, or a combination thereof, to hardware components such as the wireless controller 840, the RF interface 870, or the antenna 842. It this therefore to be understood that a device may have multiple data link interfaces without including dedicated hardware transmit/receive (Tx/Rx) chains for each of the interfaces.

The device 800 may communicate with other devices via the data link interface 892, the hardware components, such as the wireless controller 840, the RF interface 870, or the antenna 842, or a combination thereof. For example, the device 800 may communicate with a component (e.g., a base station) of a first wireless network (e.g., a telecommunications network) and may receive data from the component. The device 800 may also communicate with a first set of devices that correspond to a data link group of a second wireless network via the data link interface 892. The device 800 may provide the data, received from the component of the first wireless network, to the first set of devices of the second wireless network.

In some implementations, the processor 810, the display controller 826, the memory 832, the CODEC 834, and the wireless controller 840 are included in a system-in-package or system-on-chip device 822. Additionally or alternatively, an input device 830 and a power supply 844 are coupled to the system-on-chip device 822. Moreover, in other implementations, as illustrated in FIG. 8, the display 828, the input device 830, the speaker 836, the microphone 838, the antenna 842, and the power supply 844 are external to the system-on-chip device 822. However, each of the display 828, the input device 830, the speaker 836, the microphone 838, the antenna 842, and the power supply 844 can be coupled to a component of the system-on-chip device 822, such as an interface or a controller.

In conjunction with the described aspects, an apparatus may include means for determining a first identifier that corresponds to a data link group identifier. For example, the means for determining the first identifier may include the data link networking circuitry 114, the data link networking circuitry 166 of FIG. 1, the data link networking circuitry 890, the processor 810 configured to execute the instructions 868 of FIG. 8, one or more other devices or circuits configured to determine a first identifier that corresponds to a data link group identifier, or any combination thereof.

The apparatus may also include means for determining a second identifier that corresponds to the device. For example, the means for determining the second identifier may include the data link networking circuitry 114, the data link networking circuitry 166 of FIG. 1, the data link networking circuitry 890, the processor 810 configured to execute the instructions 868 of FIG. 8, one or more other devices or circuits configured to determine a second identifier that corresponds to the device, or any combination thereof.

The apparatus may further include means for generating an internet protocol (IP) address for a data link interface of the device by combining a data link routing prefix, the first identifier, and the second identifier. For example, the means for generating the IP address may include the data link networking circuitry 114, the data link networking circuitry 166 of FIG. 1, the data link networking circuitry 890, the processor 810 configured to execute the instructions 868 of FIG. 8, one or more other devices or circuits configured to generate an IP address for a data link interface of the device, or any combination thereof.

Further, in conjunction with the described aspects, a second apparatus may include means for determining a first identifier that corresponds to a data link group identifier of a data link group. For example, the means for determining the first identifier may include the data link networking circuitry 114, the data link networking circuitry 166 of FIG. 1, the data link networking circuitry 890, the processor 810 configured to execute the instructions 868 of FIG. 8, one or more other devices or circuits configured to determine a first identifier that corresponds to a data link group identifier, or any combination thereof.

The second apparatus may also include means for generating a data link subnet identifier by combining the first identifier with a routing prefix. For example, the means for determining the data link subnet identifier may include the data link networking circuitry 114, the data link networking circuitry 166 of FIG. 1, the data link networking circuitry 890, the processor 810 configured to execute the instructions 868 of FIG. 8, one or more other devices or circuits configured to generate a data link subnet identifier by combining the first identifier with a routing prefix, or any combination thereof.

The second apparatus may further include means for determining a second identifier that corresponds to the device. For example, the means for determining the second identifier may include the data link networking circuitry 114, the data link networking circuitry 166 of FIG. 1, the data link networking circuitry 890, the processor 810 configured to execute the instructions 868 of FIG. 8, one or more other devices or circuits configured to determine a second identifier that corresponds to the device, or any combination thereof.

The second apparatus may also include means for generating an IP address for a data link interface of the device by combining the data link subnet identifier and the second identifier. For example, the means for generating the IP address may include the data link networking circuitry 114, the data link networking circuitry 166 of FIG. 1, the data link networking circuitry 890, the processor 810 configured to execute the instructions 868 of FIG. 8, one or more other devices or circuits configured to generate an IP address for a data link interface of the device, or any combination thereof.

Further, in conjunction with the described aspects, a third apparatus may include means for determining a local address prefix. For example, the means for determining the local address prefix may include the data link networking circuitry 114, the data link networking circuitry 166, the data link networking circuitry 890, the processor 810 configured to execute the instructions 868 of FIG. 8, one or more other devices or circuits configured to determine a local address prefix, or any combination thereof.

The third apparatus may also include means for determining a first identifier that corresponds to an organization. For example, the means for determining the first identifier may include the data link networking circuitry 114, the data link networking circuitry 166, the data link networking circuitry 890, the processor 810 configured to execute the instructions 868 of FIG. 8, one or more other devices or circuits configured to determine a first identifier that corresponds to an organization, or any combination thereof.

The third apparatus may further include means for determining a second identifier that corresponds to a data link group identifier. For example, the means for determining the second identifier may include the data link networking circuitry 114, the data link networking circuitry 166, the data link networking circuitry 890, the processor 810 configured to execute the instructions 868 of FIG. 8, one or more other devices or circuits configured to determine a second identifier that corresponds to a data link group identifier, or any combination thereof.

The third apparatus may include means for generating an IP address for a data link interface based on combining at least the local address prefix, a local indicator bit, the first identifier, and the second identifier. For example, the means for generating the IP address may include the data link networking circuitry 114, the data link networking circuitry 166, the data link networking circuitry 890, the processor 810 configured to execute the instructions 868 of FIG. 8, one or more other devices or circuits configured to generate an IP address for a data link interface, or any combination thereof.

One or more of the disclosed aspects may be implemented in a system or an apparatus, such as the device 800, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 800 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a drone, a satellite, a vehicle (e.g., an automobile, a truck, an airplane, a boat, etc.), a component of or within a vehicle, a base station, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1-8 may illustrate systems, apparatuses, methods, or a combination thereof, according to the teachings of the disclosure, the disclosure is not limited to these illustrated systems, apparatuses, methods, or a combination thereof. One or more functions or components of any of FIGS. 1-8 as illustrated or described herein may be combined with one or more other portions of another of FIGS. 1-8. Accordingly, no single aspect described herein should be construed as limiting and aspects of the disclosure may be suitably combined without departing from the teachings of the disclosure. One or more components of the system 100 of FIG. 1, the second device 108 of FIG. 2, or the device 800 of FIG. 8 may be implemented via dedicated hardware (e.g., circuitry), by a processor executing instructions (e.g., the instructions 860) to perform one or more tasks, or a combination thereof.

Those of skill would further appreciate that the various illustrative logical blocks, configurations, circuits, and algorithm steps described in connection with the aspects disclosed herein may be implemented as electronic hardware, computer software executed by a processor, or combinations of both. Various illustrative components, blocks, configurations, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be included directly in hardware, in software executed by a processor, or in a combination of the two. Software (e.g., instructions) may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. For example, a storage medium may be coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. An apparatus comprising:
  a memory; and
  a processor coupled to the memory, the processor configured to:
    determine a routing prefix;
    determine a first identifier of a data link group by applying a hash function to a data link group identifier of a neighbor aware network (NAN);
    determine a second identifier that corresponds to a device; and
    generate an internet protocol (IP) address for a data link interface of the device based on a combination of the routing prefix, the first identifier, and the second identifier.

2. The apparatus of claim 1, wherein the processor is further configured to concatenate the routing prefix, the first identifier, and the second identifier to generate the IP address, and wherein the routing prefix is dedicated for use in data link networks.

3. The apparatus of claim 1, wherein the data link interface is configured to transmit a first data packet to one or more devices of the data link group, wherein a header of the first data packet includes address data that indicates the IP address for the data link interface as a source address of the first data packet.

4. The apparatus of claim 3, further comprising a receiver coupled to the processor, the receiver configured to:
  receive a second data packet from a second device of the data link group, wherein a second header of the second data packet includes second address data that indicates the IP address for the data link interface as a destination address of the second data packet; and
  provide the second data packet to the data link interface based on the IP address included in the second data packet.

5. The apparatus of claim 1, wherein the first identifier comprises a subnet identifier, wherein the first identifier comprises a non-global identifier, and wherein the routing prefix comprises a data link routing prefix.

6. The apparatus of claim 1, wherein the data link group corresponds to a neighbor aware network data link (NDL) group of a neighbor aware network (NAN), and wherein the data link group identifier is unique within the NAN.

7. The apparatus of claim 1, wherein the IP address corresponds to an IP version 6 (IPv6) address or an IP version 4 (IPv4) address.

8. The apparatus of claim 1, wherein the processor is further configured to determine the second identifier based on a media access control (MAC) identifier of the device, and wherein the second identifier comprises an interface identifier.

9. The apparatus of claim 8, further comprising a second data link interface, wherein the processor is further configured to:
   determine a third identifier that corresponds to a second data link group identifier of a second data link group;
   determine a fourth identifier based on a second MAC identifier of the device; and
   generate a second IP address for the second data link interface based on a combination of the routing prefix, the third identifier, and the fourth identifier.

10. The apparatus of claim 1, further comprising a second data link interface, wherein the processor is further configured to:
    generate the second data link interface;
    determine a third identifier that corresponds to a second data link group identifier of a second data link group; and
    generate a second IP address for the second data link interface based on a combination of the routing prefix, the second identifier, and the third identifier.

11. The apparatus of claim 1, wherein the processor is further configured to:
    combine the first identifier with the routing prefix to generate a data link subnet identifier, wherein the IP address is generated further based on a combination of the data link subnet identifier and the second identifier;
    determine whether the data link subnet identifier conflicts with an identifier of a subnet used by devices of a neighbor aware network (NAN); and
    update the data link subnet identifier in response to a determination that the data link subnet identifier conflicts with the identifier of the subnet used by the devices of the NAN.

12. The apparatus of claim 11, wherein the routing prefix corresponds to a non-globally routable prefix.

13. The apparatus of claim 1, wherein the processor is further configured to:
    determine a local address prefix; and
    determine a fifth identifier that corresponds to an organization, wherein the routing prefix includes at least the local address prefix and the fifth identifier.

14. The apparatus of claim 13, wherein the local address prefix corresponds to an IP version 6 (IPv6) unique local address (ULA) prefix or a particular IP version 4 (IPv4) prefix.

15. The apparatus of claim 13, wherein the routing prefix further includes a local indicator bit, and wherein a combination of the local address prefix, the local indicator bit, and the fifth identifier corresponds to a unique prefix.

16. The apparatus of claim 13, wherein the IP address comprises a 128-bit IP version 6 (IPv6) address in which:
    a first seven bits indicate the local address prefix;
    a bit that sequentially follows the local address prefix comprises a local indicator bit, wherein the local indicator bit has a first value that indicates the IPv6 address is locally assigned;
    forty bits that sequentially follow the local indicator bit indicate the fifth identifier;
    sixteen bits that sequentially follow the fifth identifier indicate the first identifier; and
    sixty-four bits that sequentially follow the first identifier indicate the second identifier.

17. A method comprising:
    Determining a routing prefix;
    determining, by a device, a first identifier of a data link group by applying a hash function to a data link group identifier of a neighbor aware network (NAN), wherein the first identifier is a local identifier;
    determining, by the device, a second identifier that corresponds to the device; and
    generating, by the device, an internet protocol (IP) address for a data link interface of the device based on the routing prefix, the first identifier, and the second identifier.

18. The method of claim 17, further comprising:
    sending a first data packet from the device to one or more devices of the data link group based on the IP address for the data link interface of the device; and
    receiving a second data packet from a second device of the one or more devices of the data link group based on the IP address for the data link interface of the device.

19. The method of claim 17, further comprising:
    receiving data that corresponds to a service from a base station of a first wireless network; and
    providing the data that corresponds to the service to one or more devices of the data link group, wherein the one or more devices of the data link correspond to a second wireless network.

20. The method of claim 17, wherein the data link group corresponds to a neighbor aware network data link (NDL) group of a neighbor aware network (NAN), and wherein the data link group identifier is unique within the NAN.

21. The method of claim 17, further comprising combining, by the device, the first identifier with the routing prefix to generate a data link subnet identifier.

22. The method of claim 21, further comprising combining, by the device, the data link subnet identifier and the second identifier to generate the IP address, wherein the IP address corresponds to an IP version 6 (IPv6) address or an IP version 4 (IPv4) address.

23. The method of claim 21, further comprising:
    determining whether the data link subnet identifier conflicts with an identifier of a subnet used by devices of a data link network; and
    updating the data link subnet identifier in response to determining that the data link subnet identifier conflicts with the identifier of the subnet used by the devices of the data link network.

24. The method of claim 23, further comprising:
    receiving a conflict notification from a second device, the conflict notification including conflict data that indicates that the data link subnet identifier is in use by another device; and
    determining that the data link subnet identifier conflicts with the identifier of the subnet used by the devices of the data link network in response to receiving the conflict notification.

25. The method of claim 17, further comprising:
    determining, by the device, a local address prefix; and determining, by the device, a third identifier that corresponds to an organization, wherein the routing prefix includes the local address prefix, a local indicator bit, and the third identifier.

26. The method of claim 25, further comprising:

generating, by an application of the device, a first command, the first command configured to cause generation of a second data link interface;

generating, at the device, the second data link interface in response to executing the first command, the second data link interface corresponding to a second IP address and a second data link group; and in response to executing a second command, assigning a third IP address to the second data link interface, wherein the second data link interface corresponds to a third data link group.

27. An apparatus comprising:

means for determining a routing prefix;

means for determining a first identifier of a data link group by applying a hash function to a data link group identifier of a neighbor aware network (NAN);

means for determining a second identifier that corresponds to a device; and means for generating an internet protocol (IP) address for a data link interface of the device based on a combination of the routing prefix, the first identifier, and the second identifier.

28. The apparatus of claim 27, further comprising:

means for generating a data link subnet identifier by combining the first identifier with the routing prefix; and means for updating the data link subnet identifier in response to determining that the data link subnet identifier conflicts with an identifier of a subnet used by devices of a data link network.

29. A computer-readable storage device storing instructions that, when executed by a processor, cause the processor to perform operations comprising:

determining a routing prefix;

determining a first identifier of a data link group by applying a hash function to a data link group identifier of a neighbor aware network (NAN), wherein the first identifier is a local identifier;

determining a second identifier that corresponds to a device; and generating an internet protocol (IP) address for a data link interface of the device based on the routing prefix, the first identifier, and the second identifier.

30. The computer-readable storage device of claim 29, wherein the IP address corresponds to an IP version 6 (IPv6) address or an IP version 4 (IPv4) address, and wherein the data link routing prefix is used in a data link network.

* * * * *